(12) United States Patent
Hashimoto et al.

(10) Patent No.: US 11,908,337 B2
(45) Date of Patent: Feb. 20, 2024

(54) INFORMATION PROCESSING DEVICE, INTERMEDIATION DEVICE, SIMULATION SYSTEM, AND INFORMATION PROCESSING METHOD

(71) Applicant: KAWASAKI JUKOGYO KABUSHIKI KAISHA, Hyogo (JP)

(72) Inventors: Yasuhiko Hashimoto, Kobe (JP); Masayuki Kamon, Akashi (JP); Shigetsugu Tanaka, Akashi (JP); Yoshihiko Maruyama, Osaka (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 516 days.

(21) Appl. No.: 17/267,420

(22) PCT Filed: Aug. 9, 2019

(86) PCT No.: PCT/JP2019/031615
§ 371 (c)(1),
(2) Date: Feb. 9, 2021

(87) PCT Pub. No.: WO2020/032249
PCT Pub. Date: Feb. 13, 2020

(65) Prior Publication Data
US 2021/0291369 A1    Sep. 23, 2021

(30) Foreign Application Priority Data

Aug. 10, 2018 (JP) .................................. 2018-151917
Jun. 5, 2019 (JP) .................................. 2019-105752

(51) Int. Cl.
*A63F 13/20* (2014.01)
*A63F 13/23* (2014.01)
(Continued)

(52) U.S. Cl.
CPC .............. *G09B 19/00* (2013.01); *A63F 13/25* (2014.09); *A63F 13/50* (2014.09); *A63F 13/67* (2014.09);
(Continued)

(58) Field of Classification Search
CPC ........ B25J 9/1605; B25J 9/163; B25J 9/1661; B25J 9/1671; B25J 9/1697; B25J 13/006;
(Continued)

(56) References Cited

U.S. PATENT DOCUMENTS

2009/0319238 A1* 12/2009 Bedard ..................... G09B 9/08
703/6
2015/0079545 A1* 3/2015 Kurtz ...................... G06F 21/32
434/30
(Continued)

FOREIGN PATENT DOCUMENTS

CN           1284368 C      11/2006
CN        106530888 A   *   3/2017
(Continued)

*Primary Examiner* — Adam R Mott
*Assistant Examiner* — Heather J Keniry
(74) *Attorney, Agent, or Firm* — Studebaker & Brackett PC

(57) ABSTRACT

An information processing device converts first information for manipulating a robot model inputted into a manipulation terminal connected with a simulation device configured to execute a simulation for causing the robot model to perform a simulated operation and operated by a remote user of the simulation device, into second information for manipulating the robot model of the simulation device, operates the simulation device according to the second information, and causes the manipulation terminal to present information on the operation of the robot model of the simulation device configured to operate according to the second information.

14 Claims, 12 Drawing Sheets

(51) Int. Cl.

| | | |
|---|---|---|
| *A63F 13/25* | (2014.01) | |
| *A63F 13/28* | (2014.01) | |
| *A63F 13/50* | (2014.01) | |
| *A63F 13/65* | (2014.01) | |
| *A63F 13/67* | (2014.01) | |
| *B25J 13/00* | (2006.01) | |
| *B25J 13/02* | (2006.01) | |
| *B25J 13/06* | (2006.01) | |
| *B25J 13/08* | (2006.01) | |
| *B25J 19/00* | (2006.01) | |
| *B25J 19/02* | (2006.01) | |
| *B25J 9/00* | (2006.01) | |
| *B25J 9/16* | (2006.01) | |
| *G09B 19/00* | (2006.01) | |
| *G09B 19/16* | (2006.01) | |
| *G09B 19/24* | (2006.01) | |
| *G09B 5/02* | (2006.01) | |
| *G09B 9/00* | (2006.01) | |

(52) U.S. Cl.
CPC ............. *B25J 9/0081* (2013.01); *B25J 9/161* (2013.01); *B25J 9/163* (2013.01); *B25J 9/1605* (2013.01); *B25J 9/1661* (2013.01); *B25J 9/1671* (2013.01); *B25J 9/1697* (2013.01); *B25J 13/006* (2013.01); *B25J 13/02* (2013.01); *B25J 13/06* (2013.01); *B25J 13/065* (2013.01); *B25J 13/082* (2013.01); *B25J 13/088* (2013.01); *B25J 19/021* (2013.01)

(58) Field of Classification Search
CPC . B25J 13/02; B25J 13/06; B25J 13/065; B25J 13/082; B25J 13/088; B25J 19/021; B25J 19/00; B25J 9/0081; B25J 9/161; G05B 2219/40099; G05B 2219/40515; A63F 13/20; A63F 13/23; A63F 13/28; A63F 13/65; A63F 13/25; A63F 13/50; A63F 13/67; G09B 19/24; G09B 5/02; G09B 19/16; G09B 9/00; G09B 19/00
See application file for complete search history.

(56) References Cited

U.S. PATENT DOCUMENTS

| | | | |
|---|---|---|---|
| 2015/0314440 A1 | | 11/2015 | Parker |
| 2018/0104521 A1 | * | 4/2018 | Johnson ............... A63B 21/072 |
| 2019/0275675 A1 | * | 9/2019 | Seno ..................... G05B 19/02 |

FOREIGN PATENT DOCUMENTS

| | | | | |
|---|---|---|---|---|
| JP | 2002-254373 | A | | 9/2002 |
| JP | 2002254373 | A | * | 9/2002 |
| JP | 2004-309858 | A | | 11/2004 |
| JP | 2011-125991 | A | | 6/2011 |
| JP | 2014-520279 | A | | 8/2014 |
| KR | 10-2017-0116310 | A | | 10/2017 |
| WO | 2012/151585 | A2 | | 11/2012 |

\* cited by examiner

INFORMATION PROCESSING DEVICE, INTERMEDIATION DEVICE, SIMULATION SYSTEM, AND INFORMATION PROCESSING METHOD

TECHNICAL FIELD

The present disclosure relates to an information processing device, an intermediation device, a simulation system, and an information processing method.

BACKGROUND ART

Conventionally, mobilization of works having been performed by humans has been progressed. When a robot is manipulated by a person, a training is needed for the manipulating person. For example, Patent Document 1 discloses a training device for manipulating a life-support robotic arm. This training device is implemented by a simulator which is executed on a computer device and imitates functions of the life-support robotic arm.

Reference Document of Conventional Art

Patent Document

[Patent Document 1] JP2011-125991A

DESCRIPTION OF THE DISCLOSURE

Problem(s) to be Solved by the Disclosure

In recent years, in the industries handling industrial robots, there is a concern about a lack of operators of the robots because of a declining birthrate and a growing proportion of elderly people. Meanwhile, for some reasons, the number of persons who cannot fully work or do not work increases. Manpower of such persons is precious.

Therefore, one purpose of the present disclosure is to provide an information processing device, an intermediation device, a simulation system, and an information processing method, which enable various persons to manipulate a robot by giving him/her a simulation of the manipulation of the robot.

SUMMARY OF THE DISCLOSURE

In order to achieve the purpose, an information processing device according to one aspect of the present disclosure converts first information for manipulating a robot model inputted into a manipulation terminal connected with a simulation device configured to execute a simulation for causing the robot model to perform a simulated operation and operated by a remote user of the simulation device, into second information for manipulating the robot model of the simulation device. The information processing device operates the simulation device according to the second information, and causes the manipulation terminal to present information on the operation of the robot model of the simulation device configured to operate according to the second information.

Moreover, an intermediation device according to one aspect of the present disclosure includes the information processing device according to the aspect of the present disclosure described above, and the intermediation device mediates between the manipulation terminal and the simulation device through a communication network.

Moreover, a simulation system according to another aspect of the present disclosure includes the information processing device according to the aspect of the present disclosure described above, the simulation device, and an intermediation device configured to mediate between the manipulation terminal and the simulation device through a communication network.

Moreover, an information processing method according to another aspect of the present disclosure includes the step of converting first information for manipulating a robot model inputted into a manipulation terminal connected with a simulation device configured to execute a simulation for causing a robot model to perform a simulated operation and operated by a remote user of the simulation device, into second information for manipulating the robot model of the simulation device. The method includes the steps of causing the simulation device to operate according to the second information, and causing the manipulation terminal to present information on the operation of the robot model of the simulation device configured to operate according to the second information.

Effect of the Disclosure

According to the present disclosure, various persons become able to manipulate a robot by performing a simulation of the manipulation of the robot.

MODE FOR CARRYING OUT THE DISCLOSURE

Figure 1:
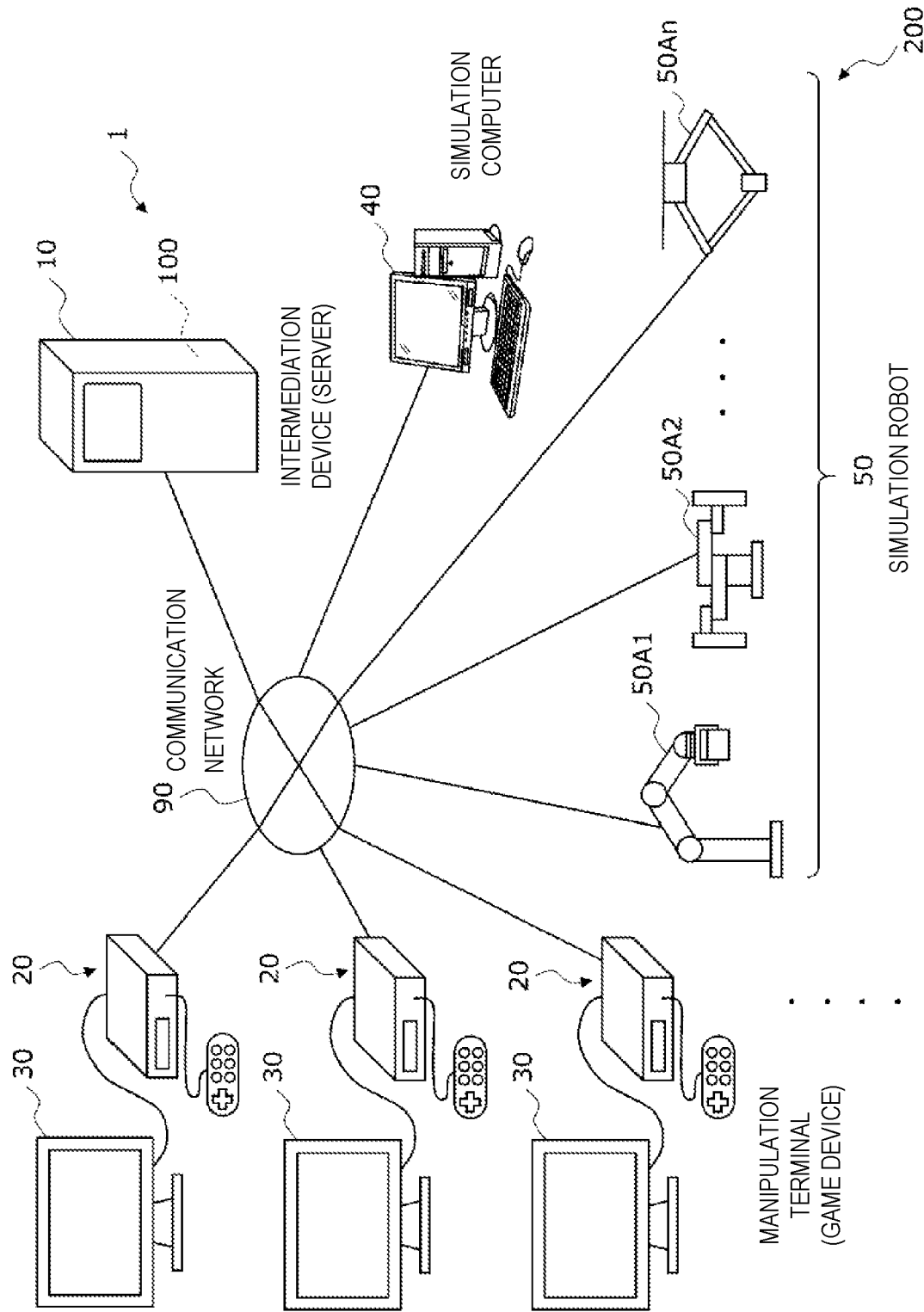
FIG. 1 is a view illustrating one example of a configuration of a simulation system according to one embodiment.

Hereinafter, embodiments of the present disclosure will be described with reference to the drawings. Note that the following embodiment describes a comprehensive or concrete example. Moreover, components which are not described in independent claims which are the broadest concept, among components in the following embodiment, are described as arbitrary components. Moreover, each of the accompanying drawings is a schematic drawing, and therefore, it is not intended to be illustrated strictly. Moreover, in each drawing, the same reference characters are assigned to substantially the same components, and redundant description may be omitted or simplified. Moreover, in this description and the appended claims, "device" does not only mean a single device, but it may also mean a system comprised of a plurality of devices.

Configuration of Simulation System

A configuration of a simulation system 1 according to this embodiment is described. FIG. 1 is a view illustrating one example of a configuration of the simulation system 1 according to this embodiment. As illustrated in FIG. 1, the simulation system 1 includes one or more intermediation devices 10, one or more manipulation terminals 20, one or more simulation computers 40, and one or more simulation robots 50. The simulation computer 40 and the simulation robot 50 are examples of a simulation device 200. In the following, when not distinguishing the "simulation computer 40" from the "simulation robot 50," or vice versa, they may simply be referred to as the "simulation device 200." The intermediation device 10, the manipulation terminal 20, the simulation computer 40, and the simulation robot 50 are connected to each other through a communication network 90. Note that not all the components are essential.

The communication network 90 is a network in which data communication is possible, and, for example, it may be an Internet, an intranet, a wired or wireless LAN (Local Area Network), a WAN (Wide Area Network), a mobile communication network, a telephone network, or other communication networks using wired or wireless communications. In this embodiment, the communication network 90 is the Internet.

The simulation computer 40 is a device for executing a simulation in which an imaginary robot model carries out a simulated operation. The imaginary robot model is generated and runs on the computer program of the simulation computer 40. Note that the simulation computer 40 may or may not be a device produced especially for the simulation system 1, and, for example, it may be an existing or general-purpose device used for the simulation of the robot manipulation. The robot model of the simulation computer 40 may be an imaginary robot model of robots which are illustrated as actual robots 50A1-50An (n is a natural number (n=1, . . . )) of a simulation robot 50 (described later). The imaginary robot model may have a configuration including a robot body similar to the simulation robot 50 (described later), or may have a configuration including not only the robot body but processing object(s), peripheral device(s), etc.

The simulation robot 50 is a device for executing the simulation which causing the actual robots 50A1-50An (n is a natural number (n=1, . . . )) to carry out the simulated operation as a robot model. The robots 50A1-50An may be any kind of robots, and, for example, they may be industrial robots, service robots, construction machinery, tunnel boring machines, cranes, cargo handling vehicles, humanoids, etc. The service robot is a robot which is used in various service industries, such as nursing, medical science, cleaning, guard, guide, rescue, cooking, and goods offering. In this embodiment, the robots are industrial robots, such as vertical articulated robots, horizontal articulated robots, polar-coordinate robots, cylindrical-coordinate robots, and rectangular-coordinate robots. In the following, when not distinguishing the robots 50A1-50An from each other, they may simply be referred to as the "robot 50A."

The simulation robot 50 includes any of the robots 50A1-50An, and is provided to each of the robots 50A1-50An. The robots 50A1-50An, which are industrial robots, are robots provided corresponding to various works. The robots 50A1-50An may be robots actually disposed at a worksite, or may be a robot disposed for simulation. The robots 50A1-50An may have, for example, a configuration including a robot body provided with robotic arm(s) and end effector(s), or a configuration not only including the robot body but also including a processing object, such as a workpiece for the work, and peripheral devices, such as a conveying device, an imaging device, and a sensor. In the latter case, the simulation executed by the simulation robot 50 is a simulation for manipulating all of the robot body, the processing object, and the peripheral devices. Note that the simulation robot 50 may or may not be produced especially for the simulation system 1, and, for example, it may be an existing or general-purpose robot used for the simulation for the robot manipulation.

The operation executed by the robot model of the simulation computer 40 and the simulation robot 50 is an operation which includes one of, or two or more of individual operations, such as a horizontal movement, a vertical movement, and a rotation, and a work. Compared to the operation, the work is a series of complex operations in which a more number of individual operations are combined according to an execution sequence. For example, in a case of a robot model of an industrial robot, examples of the work are works, such as holding and moving an object by an end effector, holding the object by the end effector and assembling it to an object to be assembled, cutting the object by the end effector, joining two or more objects by the end effector.

The manipulation terminal 20 is a device which executes a computer program for performing a simulation of operation of the robot using the simulation device 200. The manipulation terminal 20 can be connected with the simulation device 200 through the communication network 90, and can be operated by a user of the manipulation terminal 20. The user can execute the simulation by operating the manipulation terminal 20, even if he/she is located distant from the simulation device 200. The manipulation terminal 20 outputs information inputted by the user to the simulation device 200. Examples of the manipulation terminal 20 are a game machine, a game controller, a remote controller dedicated for a robot, a personal data assistant (PDA), a smartphone, a smart device such as a smartwatch and a tablet, and a computer device such as a personal computer. Such a manipulation terminal may or may not be a device produced especially for the simulation system 1, or may be an existing or general-purpose device.

In this embodiment, the manipulation terminal 20 is a game device provided with a game machine and a game controller. The game device includes, for example, a non-portable game device and a portable game device. The manipulation terminal 20 is connected to an output device 30 and outputs to the output device 30 an image signal and an audio signal for performing the simulation using the robot model. The output device 30 presents the user the image and the voice corresponding to the image signal and the audio signal. For example, the output device 30 is provided with a display and a speaker. Examples of the display are a liquid crystal display, and an organic or inorganic EL display (Electro-Luminescence Display).

The intermediation device 10 mediates between one or more manipulation terminals 20, one or more simulation computers 40, and one or more simulation robots 50 through the communication network 90. In this embodiment, the intermediation device 10 is provided with an information processing device 100. In this embodiment, the intermediation device 10 is a server and is a computer device having a communication capability and processing information.

The information processing device 100 is a device for managing the simulation for the robot manipulation using the manipulation terminal 20. The information processing device 100 is comprised of, for example, a computing unit having a processor, a memory, etc. The memory is comprised of a storage, such as a semiconductor memory (e.g., a volatile memory and a nonvolatile memory), a hard disk drive (HDD), and an SSD (Solid State Drive). For example, the functions of the computing unit may be implemented by a computer system (not illustrated) comprised of a processor such as a CPU (Central Processing Unit), a volatile memory such as a RAM (Random Access Memory), and a nonvolatile memory such as a ROM (Read-Only Memory). Some or all of the function of the computing unit may be implemented by the CPU executing a program recorded on the ROM using the RAM as a work area. Note that some or all of the functions of the computing unit may be implemented by the computer system described above, may be implemented by dedicated hardware circuitry such as an electronic circuit or an integrated circuit, or may be implemented by a combination of the computer system and the hardware circuitry.

In detail, the information processing device 100 may be comprised of, for example, a computer device, such as a computer and a personal computer. Alternatively, the information processing device 100 may be comprised of, for example, a microcontroller, an MPU (Micro Processing Unit), an LSI (Large Scale Integration), a system LSI, a PLC (Programmable Logic Controller), and a logic circuit. The plurality of functions of the information processing device 100 may be implemented by individual chips, or may be implemented by a sole chip including a part or all the functions. Alternatively, the circuit may be a general-purpose circuit, or may be a circuit for exclusive use. As the LSI, an FPGA (Field Programmable Gate Array) which can be programmed after the manufacture of the LSI, a reconfigurable processor which can reconfigure a connection and/or a setting of a circuit cell inside the LSI, or an ASIC (Application Specific Integrated Circuit) in which circuits for a plurality of functions are integrated into one circuitry for particular applications, may be used.

The information processing device 100 receives from the manipulation terminal 20, first information which is information for manipulating the robot model inputted by the user into the manipulation terminal 20, and converts the first information into second information which is information for manipulating the robot model of the simulation device 200. The information processing device 100 transmits the second information to the simulation device 200, and operates it according to the second information.

Moreover, the information processing device 100 receives, from the simulation device 200 which operates according to the second information, third information which is information on the operation of this robot model, and converts the third information into fourth information which is information processable by the manipulation terminal 20. For example, the information processing device 100 receives the third information indicative of each operation of the robot model of the simulation device 200, and converts the third information into the fourth information as information which functions on the execution program of the manipulation terminal 20. The information processing device 100 transmits to the manipulation terminal 20, the fourth information to the manipulation terminal 20 to present the user the operation of the robot model of the simulation device 200, or a pseudo robot model of the robot model, or a corresponding model, through the output device 30. The corresponding model may be a model associated with the robot model, and, for example, it may not be apparently similar to the robot model.

For example, the information processing device 100 may receive information on an image of the robot 50A of the simulation robot 50 captured by the imaging device as the third information and transmit the information on the image to the manipulation terminal 20 as the fourth information to cause the manipulation terminal 20 to present it as the information on the operation of the robot model. Thus, the user can perform the manipulation through the manipulation terminal 20, while visually recognizing the robot model of the simulation computer 40 or the simulation robot 50.

Moreover, the information processing device 100 determines, based on request information which is inputted into the manipulation terminal 20 by the user and is information on the simulation requested to be executed, a simulation device 200 corresponding to the simulation requested in the request information among the plurality of simulation devices 200. Moreover, the information processing device 100 connects the determined simulation device 200 with the manipulation terminal 20 through the communication network 90 to enable the execution of simulation using the simulation device 200.

Moreover, the information processing device 100 evaluates an operation result of the robot model based on the information on the operation of the robot model received from the simulation device 200. The information processing device 100 compares each of the received operation of the robot model with operation to be executed in the simulation, and, for example, it may determine the evaluation based on differences in their positions and durations. Alternatively, the simulation device 200 may evaluate the result of the simulation. The information processing device 100 may receive the evaluation of the simulation result from the simulation device 200, and determine the evaluation set to the simulation system 1 based on the received evaluation. The information processing device 100 registers the determined evaluation in the storage as a user evaluation which is an evaluation of the user who operates the manipulation terminal 20. The storage may be a storage of the information processing device 100, or may be a storage (not illustrated) included in the intermediation device 10, or may be a storage of another device connected with the intermediation device 10 through the communication network 90. Moreover, the information processing device 100 transmits the determined evaluation to the manipulation terminal 20 to present it to the user through the output device 30.

Hardware Configuration

Figure 2:
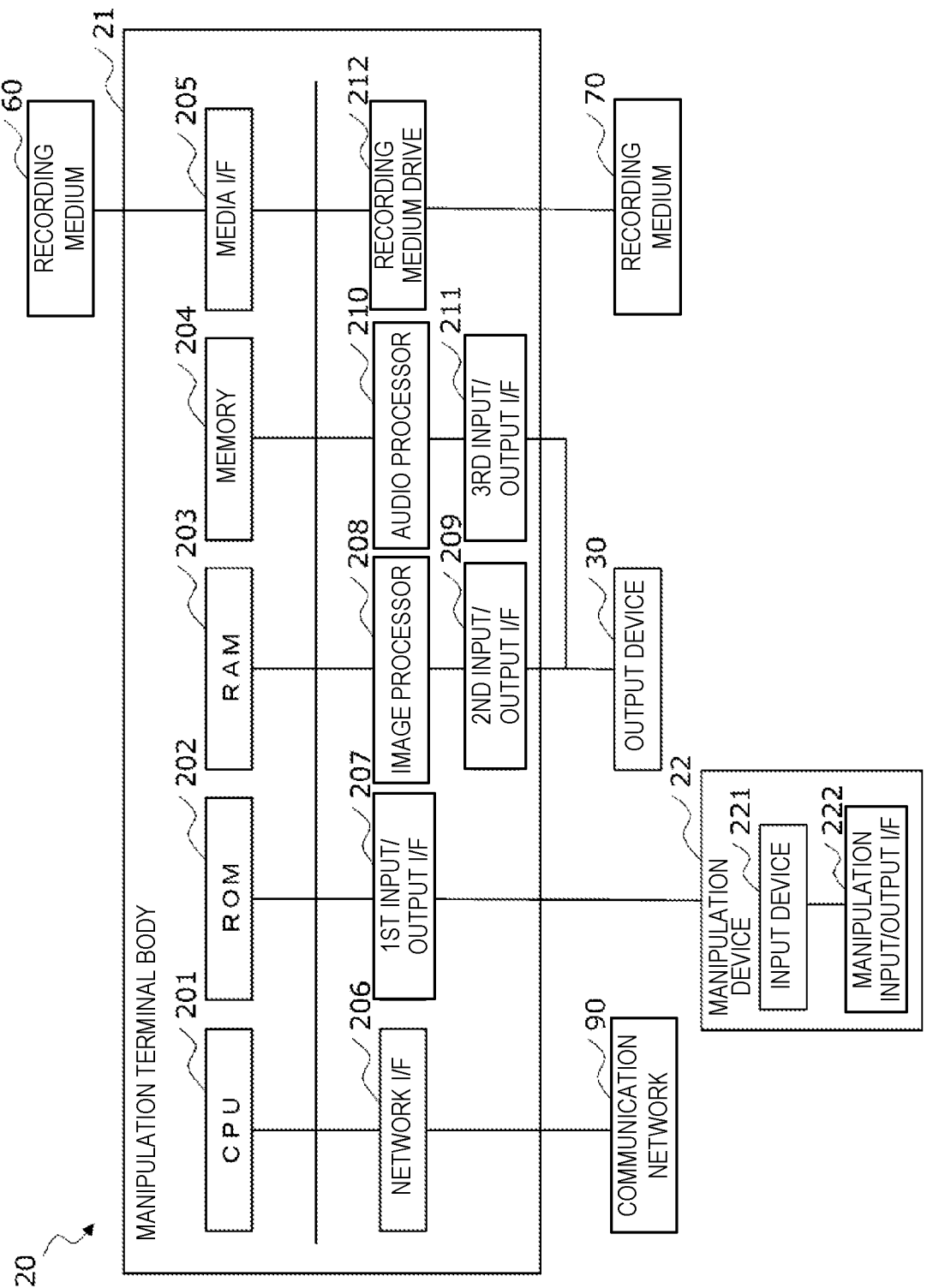
FIG. 2 is a block diagram illustrating one example of a hardware configuration of a manipulation terminal according to the embodiment.

A hardware configuration of the manipulation terminal 20 is described. FIG. 2 is a block diagram illustrating one example of a hardware configuration of the manipulation terminal 20 according to this embodiment. As illustrated in FIG. 2, the manipulation terminal 20 includes a manipulation terminal body 21 as the game machine, and a manipulation device 22 as the game controller. The manipulation terminal body 21 can execute the computer program for the simulation, and the manipulation device 22 accepts an input of the manipulation by the user. The manipulation terminal body 21 includes, as components, a CPU 201, a ROM 202, a RAM 203, a memory 204, a media interface (I/F) 205, a network I/F 206, a first input/output I/F 207, an image processor 208, a second input/output I/F 209, an audio processor 210, a third input/output I/F 211, and a recording medium drive 212. Although each component is connected by a bus etc., it may be connected through any other kinds of wired communications or wireless communications. Note that not all the components are essential.

The CPU 201 controls the entire operation of the manipulation terminal body 21. The ROM 202 stores a program used for driving the CPU 201. The RAM 203 is used as a work area of the CPU 201. The memory 204 stores various data, such as a program, and is comprised of the storage described above. The media I/F 205 controls read or write (store) of data from/to a recording medium 60 such as a flash memory. For example, the computer program for executing the simulation may be stored in the recording medium 60, and may be executed by being read from the recording medium 60. Save data including the result of the simulation may be stored in the recording medium 60 or the memory 204. The network I/F 206 is an interface for carrying out data communications using the communication network 90. The first input/output I/F 207 is connected with the manipulation device 22, and is an interface for communicating a signal etc.

The image processor 208 is provided with a GPU (Graphics Processing Unit) which can generate a screen for performing the simulation. For example, the image processor 208 generates screen data, such as an image of the robot models of the simulation computer 40 and the simulation robot 50, an image of the pseudo robot model of the robot model, and an image of the model corresponding to the robot model, and outputs the image to the second input/output I/F 209. The second input/output I/F 209 is connected with the output device 30, and is an interface for communicating screen data and image data.

The audio processor 210 is provided with a DSP (Digital Signal Processor) which generates voice for the simulation. The audio processor 210 amplifies the generated voice by an amplifier (not illustrated) including a D/A converter, and outputs it to the third input/output I/F 211. The third input/output I/F 211 is connected with the output device 30, and is an interface for communicating the audio signal etc. The recording medium drive 212 controls read or write of various data from/to a recording medium 70 which is removable. For example, the computer program for executing the simulation may be stored in the recording medium 70, or may be executed by being read from the recording medium 70. Save data including the result of the simulation etc. may be stored in the recording medium 70. An example of the recording medium 70 is a recording disc, such as DVD-R, DVD-RW, BD(Blu-Ray®)-R, and BD-RE.

The manipulation device 22 accepts an input by the user. For example, the manipulation device 22 includes an input device 221 which is inputted through a manipulation by the user, such as a cross button, a push switch, a dial, a joystick, a mouse, a key, and a touch panel. Moreover, the manipulation device 22 includes a manipulation input/output I/F 222 which is connected with the first input/output I/F 207 of the manipulation terminal body 21, and communicates a signal etc. The input device 221 generates a signal indicative of the input by the user, and outputs the signal to the first input/output I/F 207 through the manipulation input/output I/F 222. In this embodiment, the configuration of the input device 221 differs from the manipulation device dedicated for the robot. For example, the number of input devices 221 and the input method to the input device 221 are different. Unlike the signal for the manipulation outputted from the input device 221, the signal for the manipulation outputted from the manipulation device dedicated for the robot is more complicated.

Figure 3:
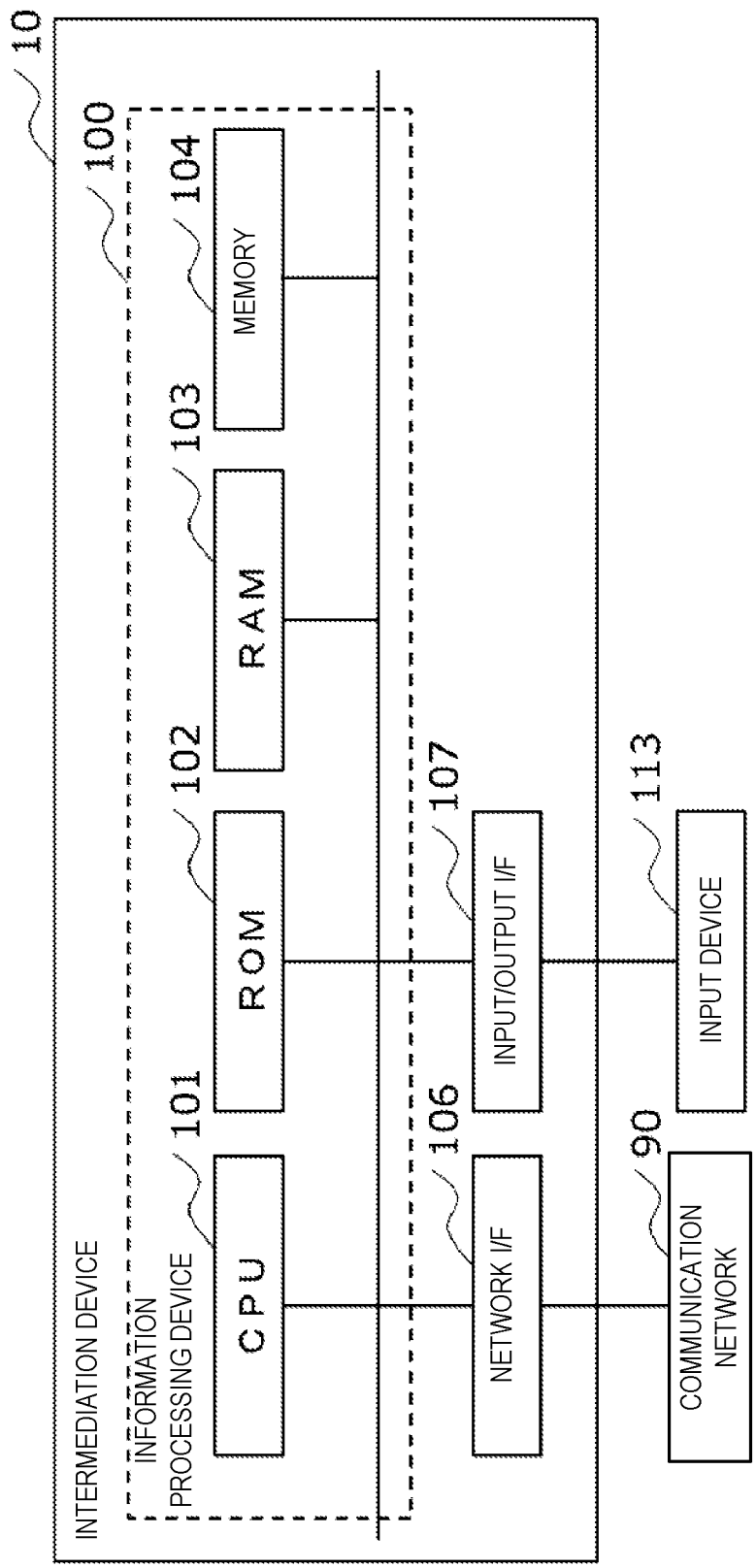
FIG. 3 is a block diagram illustrating one example of a hardware configuration of an intermediation device according to the embodiment.

A hardware configuration of the intermediation device 10 is described. FIG. 3 is a block diagram illustrating one example of the hardware configuration of the intermediation device 10 according to this embodiment. As illustrated in FIG. 3, the intermediation device 10 includes a CPU 101, a ROM 102, a RAM 103, a memory 104, a network I/F 106, and an input/output I/F 107, as components. Although each component is connected by a bus etc., it may be connected through any other kinds of wired communications or wireless communications. Note that not all the components are essential.

The CPU 101 controls the entire operation of the intermediation device 10. The configurations and functions of the ROM 102, the RAM 103, and the memory 104 are similar to those of the ROM 202, the RAM 203, and the memory 204 of the manipulation terminal 20, respectively. The CPU 101, the ROM 102, the RAM 103, and the memory 104 constitute the information processing device 100. The configurations and functions of the network I/F 106 and the input/output I/F 107 are similar to those of the network I/F 206 and the first input/output I/F 207 of the manipulation terminal 20, respectively.

Note that the input/output I/F 107 is connected with an input device 113, and is an interface for communicating a signal etc. The input device 113 accepts an input by the user. For example, the input device 113 includes a device inputted through a manipulation of the user, such as a button, a switch, a dial, a joystick, a mouse, a key, and a touch panel. The input device 113 generates a signal indicative of the user's input, and outputs the signal to the input/output I/F 107.

Figure 4:
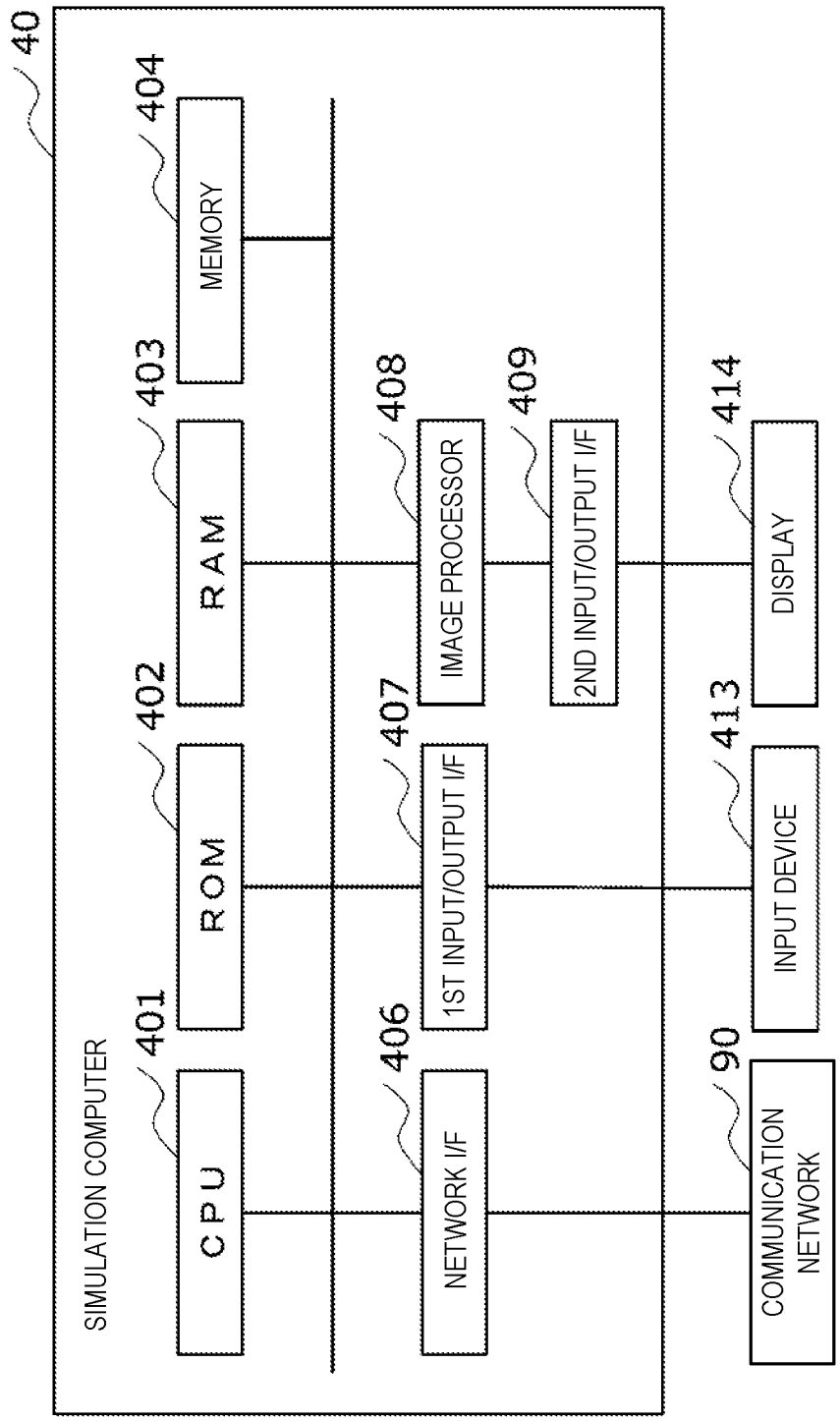
FIG. 4 is a block diagram illustrating one example of a hardware configuration of a simulation computer according to the embodiment.

A hardware configuration of the simulation computer 40 is described. FIG. 4 is a block diagram illustrating one example of the hardware configuration of the simulation computer 40 according to this embodiment. As illustrated in FIG. 4, the simulation computer 40 includes a CPU 401, a ROM 402, a RAM 403, a memory 404, a network I/F 406, a first input/output I/F 407, an image processor 408, and a second input/output I/F 409, as components. Although each component is connected by a bus etc., it may be connected through any other kinds of wired communications or wireless communications. Note that not all the components are essential.

The CPU 401 controls the entire operation of the simulation computer 40. The configurations and functions of the ROM 402, the RAM 403, and the memory 404 are similar to those of the ROM 202, the RAM 203, and the memory 204 of the manipulation terminal 20, respectively. The configurations and functions of the network I/F 406, the first input/output I/F 407, the image processor 408, and the second input/output I/F 409 are similar to those of the network I/F 206, the first input/output I/F 207, the image processor 208, and the second input/output I/F 209 of the manipulation terminal 20, respectively.

Note that the first input/output I/F 407 is connected with an input device 413, and is an interface for communicating a signal etc. The input device 413 accepts an input by the user. The configuration of the input device 413 is similar to that of the input device 113 of the intermediation device 10. Moreover, the image processor 408 generates screen data of an image of the robot model set to the simulation computer 40, and outputs it to the second input/output I/F 409. The second input/output I/F 409 is connected with a display 414 and is an interface for communicating screen data and image data.

Figure 5:
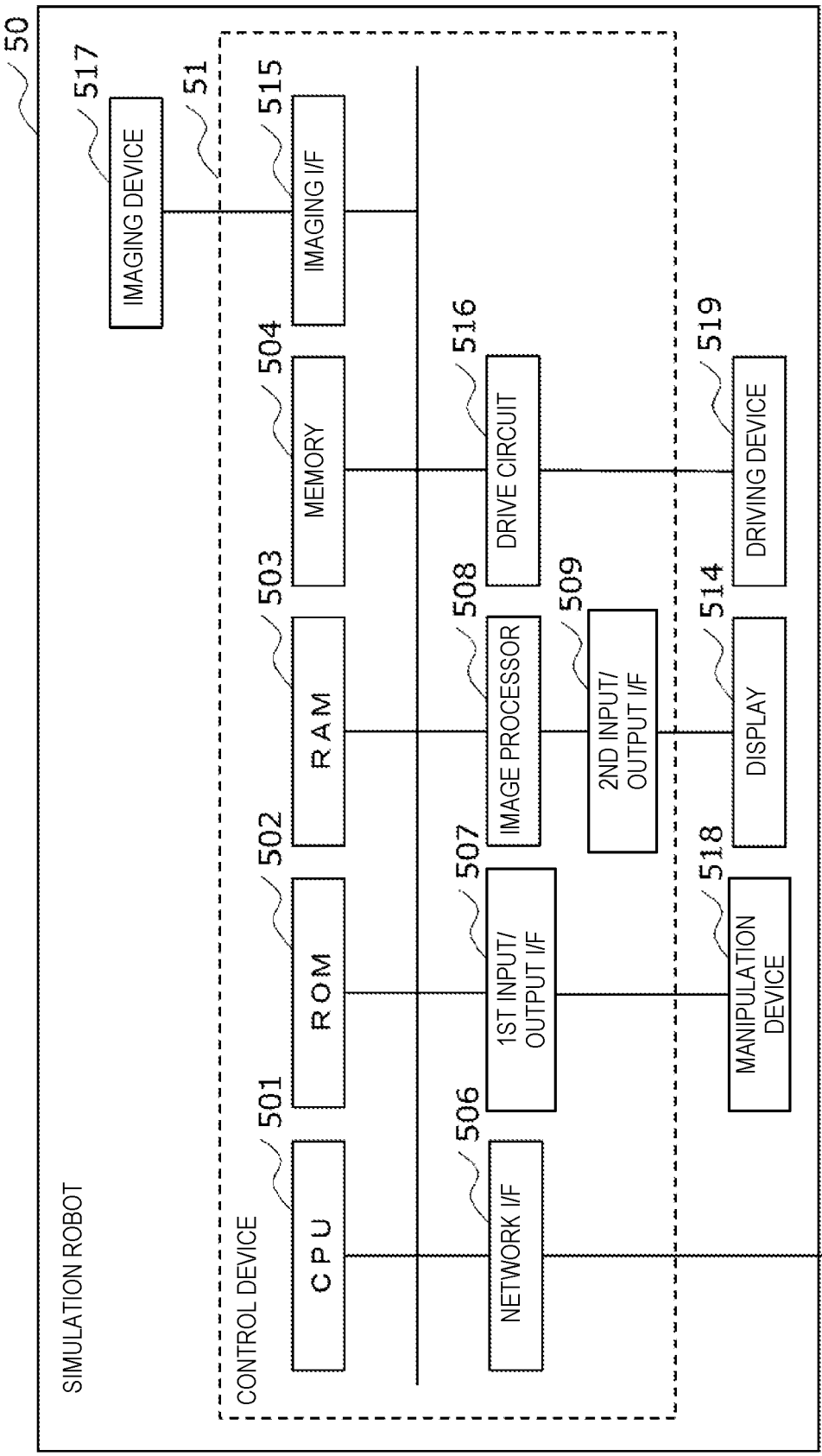
FIG. 5 is a block diagram illustrating one example of a hardware configuration of a simulation robot according to the embodiment.

A hardware configuration of the simulation robot 50 is described. FIG. 5 is a block diagram illustrating one example of the hardware configuration of the simulation robot 50 according to this embodiment. As illustrated in FIG. 5, the simulation robot 50 includes a control device 51, an imaging device 517, a display 514, a manipulation device 518, and a driving device 519. Note that not all the components are essential.

The driving device 519 is a device for driving movable part(s) of the robot 50A (see FIG. 1). For example, the robot 50A includes a robotic arm, and an end effector at a tip end of the robotic arm. The robotic arm has a bendable joint and is movable at the joint. The end effector carries out operation for applying an action to a workpiece, such as grasping (holding), sucking, scooping, and hanging. The driving device 519 drives the joint and the end effector of the robotic arm. Examples of the driving device 519 are an electric motor such as a servomotor, and a vacuum generator.

The imaging device 517 images the robot 50A and outputs the captured image data to the control device 51. The imaging device 517 provides an image indicative of a state of the robot 50A to the user who performs the simulation with the simulation robot 50. In this embodiment, the image is provided to the manipulation terminal 20. Examples of the imaging device 517 are a digital camera, a digital camcorder, etc.

The display 514 receives the image data captured by the imaging device 517 from the control device 51, and presents the user the image of the image data. Moreover, the display 514 receives the screen data for the manipulation of the simulation robot 50 from the control device 51, and presents the user the image of the screen data.

The manipulation device 518 accepts an input of a command and information by the user who performs the simulation with the simulation robot 50, and outputs a signal indicative of the command and information to the control device 51. The manipulation device 518 includes a device inputted through a manipulation of the user, such as a push switch, a lever, a dial, a joystick, a key, and a touch panel. In this embodiment, the manipulation device 518 is a manipulation device dedicated for the robot 50A.

The control device 51 is a device for controlling the entire simulation robot 50. The control device 51 includes a CPU 501, a ROM 502 and a RAM 503, a memory 504, an imaging I/F 515, a network I/F 506, a first input/output I/F 507, an image processor 508, a second input/output I/F 509, and a drive circuit 516, as components. Although each component is connected by a bus etc., it may be connected through any other kinds of wired communications or wireless communications. Note that not all the components are essential.

The CPU 501 controls operation of the entire control device 51. The configurations and functions of the ROM 502, the RAM 503, and the memory 504 are similar to those of the ROM 202, the RAM 203, and the memory 204 of the manipulation terminal 20, respectively. The configurations and functions of the network I/F 506, the first input/output I/F 507, the image processor 508, and the second input/output I/F 509 are similar to those of the network I/F 206, the first input/output I/F 207, the image processor 208, and the second input/output I/F 209 of the manipulation terminal 20, respectively.

Note that the first input/output I/F 507 is connected with the manipulation device 518, and is an interface for communicating a signal etc. Moreover, the image processor 508 generates screen data for being displayed on the display 514 by using the image data of the robot 50A captured by the imaging device 517, and outputs it to the second input/output I/F 509. Moreover, the image processor 508 generates the screen data for manipulating the simulation robot 50, and outputs it to the second input/output I/F 509. The second input/output I/F 509 is connected with the display 514 and is an interface for communicating screen data and image data.

The imaging I/F 515 controls the drive of the imaging device 517 corresponding to execution of a program. The imaging I/F 515 takes the image data captured by the imaging device 517 into the RAM 503 or the memory 504, corresponding to execution of the program. The imaging I/F 515 may also include a circuit for driving the imaging device 517.

The drive circuit 516 controls the drive of the driving device 519. For example, the drive circuit 516 supplies current to each driving device 519 according to the command from the CPU 501 to control the drive of the driving device 519. The drive circuit 516 controls the drive of all the driving devices 519.

Functional Configuration

Figure 6:
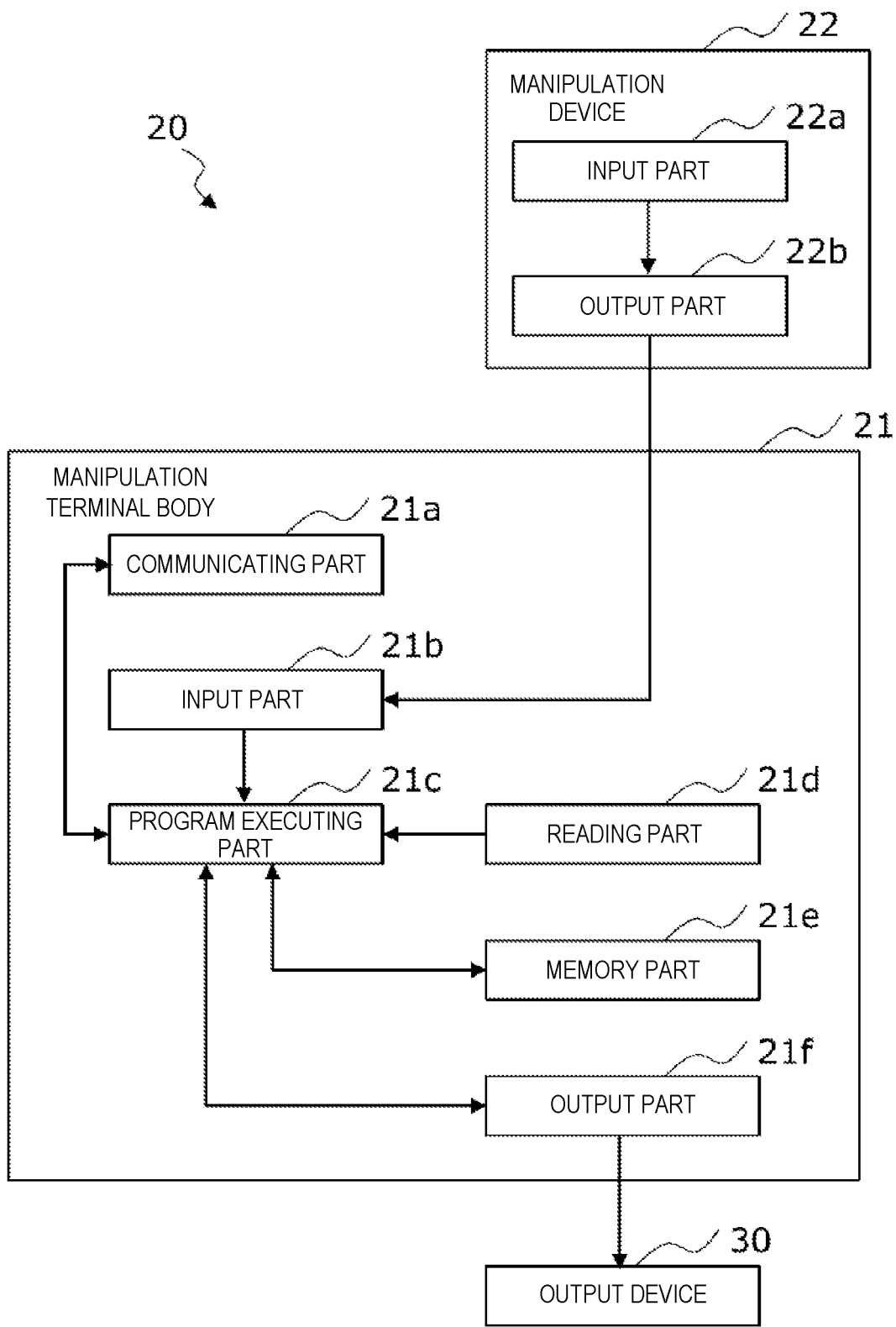
FIG. 6 is a block diagram illustrating one example of a functional configuration of the manipulation terminal according to the embodiment.

A functional configuration of the manipulation terminal 20 is described. FIG. 6 is a block diagram illustrating one example of the functional configuration of the manipulation terminal 20 according to this embodiment. As illustrated in FIG. 6, the manipulation device 22 includes an input part 22*a* and an output part 22*b*. The input part 22*a* accepts an input from the user, and the function is implemented by the input device 221. The output part 22*b* outputs the information inputted into the input part 22*a* to the manipulation terminal body 21, and the function is implemented by the manipulation input/output I/F 222. The information described above may be information, such as ON of a button of the input device 221, and duration of OFF/ON.

The manipulation terminal body 21 includes a communicating part 21*a*, an input part 21*b*, a program executing part 21*c*, a reading part 21*d*, a memory part 21*e*, and an output part 21*f*. Note that not all the components are essential. The communicating part 21*a* communicates with the intermediation device 10 through the communication network 90, and the function is implemented by the network I/F 206 etc. The input part 21*b* accepts an input of information from the manipulation device 22, and the function is implemented by the first input/output I/F 207 etc. The reading part 21*d* reads information stored in the recording medium 60 and/or the recording medium 70, and the function is implemented by the media I/F 205 and the recording medium drive 212.

The memory part 21*e* stores various information, and it is implemented by the ROM 202, the memory 204, the recording medium 60, and the recording medium 70. For example, user information of each user is stored in the memory part 21*e*. The user information may include user's identification information such as a user ID, and the result of the simulation of the user who used the manipulation terminal 20. The result of the simulation may also include a result, an evaluation, and an experience of each simulation, a user's learning level in each simulation, and a user's rank or class according to the learning level. The rank and the class may be an absolute rank corresponding to the learning level, or may be a relative rank such as a ranking based on a comparison with other users. The storing of the user information in the memory part 21e may be automatically and periodically performed by the program executing part 21c, or may be carried out by the user performing an input or save operation using the manipulation device 22.

The output part 21f outputs the image data and the voice data which are generated by the program executing part 21c to the output device 30, and the function is implemented by the second input/output I/F 209 and the third input/output I/F 211.

The program executing part 21c reads and executes the computer program stored in the recording medium 60 or the recording medium 70. The computer program is a program for executing the simulation, and, in this embodiment, it is a game program. That is, in this embodiment, the simulation is performed as a game in the manipulation terminal 20. Note that the program may be installed in the manipulation terminal 20 through the communication network 90, the recording medium 70, or the recording medium 70, as an application program, and may be stored in the ROM 202 or the memory 204.

The program executing part 21c operates according to the computer program using the information received from the manipulation device 22 and the information received through the communication network 90, and generates the image data and the voice data reflecting the received information. The program executing part 21c outputs the generated image data and voice data to the output device 30 through the output part 21f to present them to the user. Moreover, the program executing part 21c transmits the information on the manipulation received from the manipulation device 22 and the user information stored in the memory part 21e to the intermediation device 10 through the communicating part 21a and the communication network 90. The program executing part 21c is implemented by the CPU 201, the ROM 202, the RAM 203, the image processor 208, and the audio processor 210.

Figure 7:
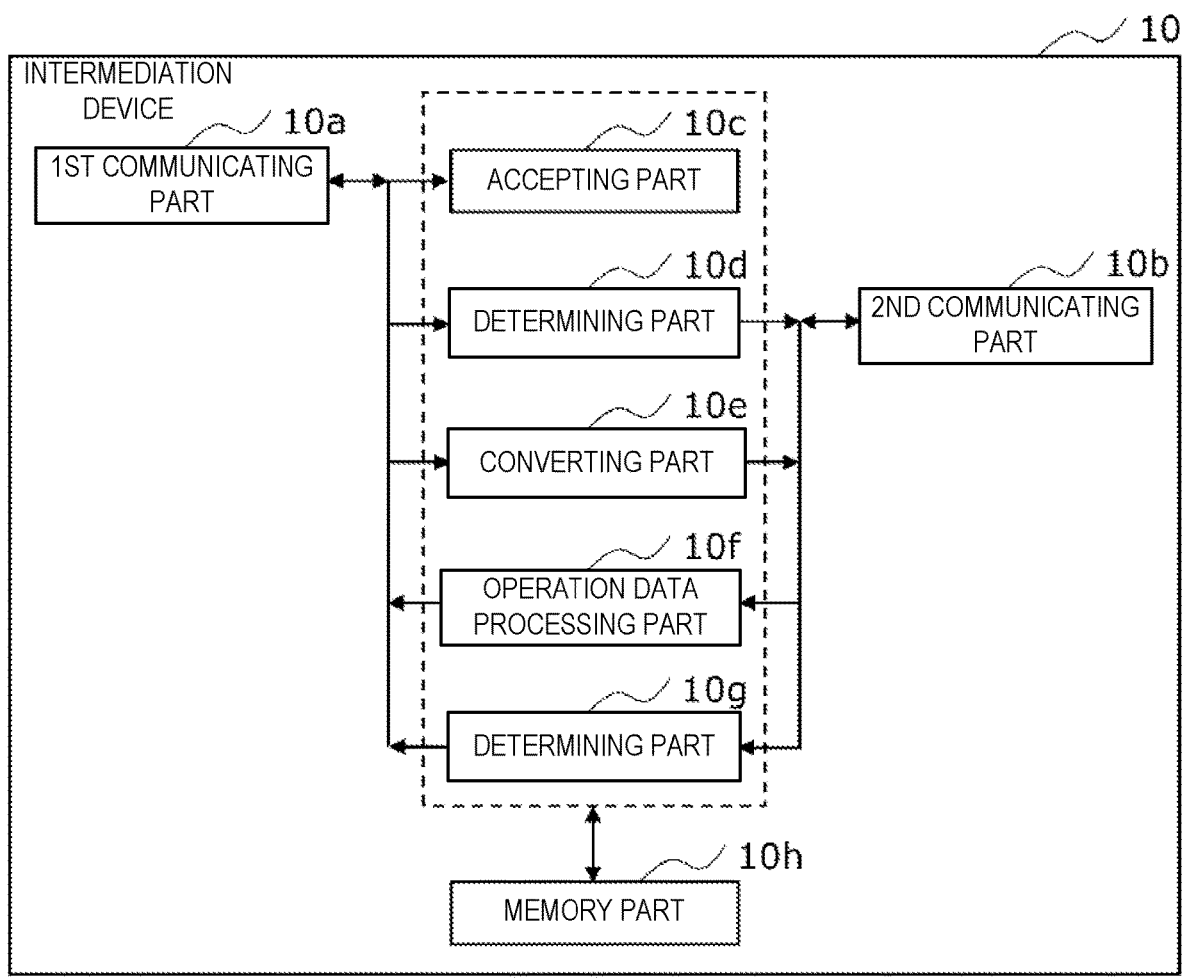
FIG. 7 is a block diagram illustrating one example of a functional configuration of the intermediation device according to the embodiment.

A functional configuration of the intermediation device 10 is described. FIG. 7 is a block diagram illustrating one example of the functional configuration of the intermediation device 10 according to this embodiment. As illustrated in FIG. 7, the intermediation device 10 includes a first communicating part 10a, a second communicating part 10b, an accepting part a determining part 10d, a converting part 10e, an operation data processing part 10f, a determining part 10g, and a memory part 10h. Note that not all the components are essential. The functions of the first communicating part 10a and the second communicating part 10b are implemented by the network I/F 106 etc. The function of the memory part 10h is implemented by the ROM 102 and the memory 104. The functions of the accepting part 10c, the determining part 10d, the converting part 10e, the Operation data processing part 10f and the determining part 10g are implemented by the CPU 101, the ROM 102, and the RAM 103.

The first communicating part 10a communicates with the manipulation terminal 20 through the communication network 90. The second communicating part 10b communicates with the simulation computer 40 or the simulation robot 50 through the communication network 90.

The memory part 10h stores various information. For example, the memory part 10h stores the user information of each user so as to be associated with the user's identification information. Moreover, the memory part 10h stores a clearance requirement of the simulation based on the rank or the class set to the user and the configuration of the simulation which can be performed with each clearance requirement so as to associate one with another. The configuration of the simulation includes the content of simulation and the simulation device 200 which can perform the content of simulation so as to associate one with another. The simulation device 200 is the simulation computer 40 or the simulation robot 50. The content of simulation may include an operation or a work of the robot model executed in the simulation, and, for example, it may be set as the type of simulation. Moreover, the memory part 10h may include the executed result of the simulation using the simulation device 200 and the evaluation related to the executed result so as to associate one with another. Moreover, the memory part 10h may include the evaluation and the learning level of the simulation corresponding to the evaluation so as to associate one with another. Moreover, the memory part may include the learning level and the clearance requirement of the simulation so as to associate one with another. The memory part 10h may include a threshold etc. which is used for determining the evaluation by the determining part 10g.

The accepting part 10c extracts the content of simulation executable by the user based on the user information received from the manipulation terminal 20, and presents it to the user. In detail, the accepting part 10c receives the user information and an execution command of the simulation from the manipulation terminal 20, and extracts the clearance requirement corresponding to the user's identification information included in the user information from the memory part 10h. Moreover, the accepting part 10c extracts the configuration of the simulation corresponding to the clearance requirement, and transmits it to the manipulation terminal 20. The user can select from the configurations of the simulations presented on the output device 30 by the manipulation terminal 20.

Figure 8:
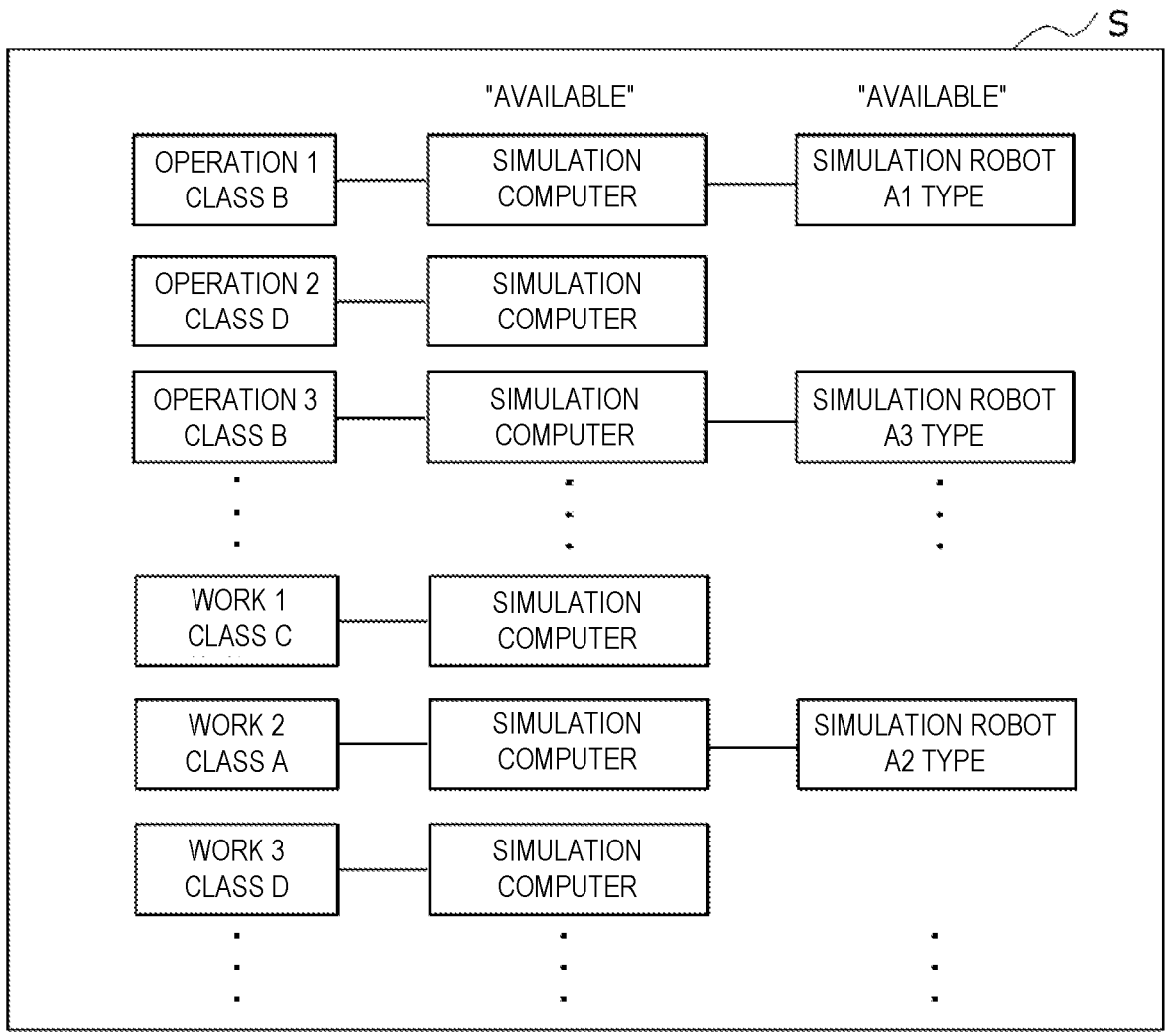
FIG. 8 is a view illustrating one example of a selection screen of the simulation presented by the manipulation terminal according to the embodiment.

For example, the manipulation terminal 20 displays a screen S as illustrated in FIG. 8 on the output device 30. FIG. 8 is a view illustrating one example of a selection screen of the simulation presented by the manipulation terminal 20 according to this embodiment. As illustrated in FIG. 8, on the screen S, for each operation or work, any one of the class "A" to "D" is displayed as the user's clearance requirement, and an icon of the simulation device 200 which can execute the simulation of each operation or work is further displayed. Therefore, by selecting the icon of the simulation device 200, the user can select the operation or work for executing the simulation, and the simulation device 200 which is used for the operation or work. For example, in FIG. 8, the operation indication "OPERATION 1; CLASS B" indicates that the user at "CLASS B" or higher can perform the simulation for "OPERATION 1." For each operation indication, the icon "SIMULATION COMPUTER" indicates the availability of the simulation computer 40, and the icon "SIMULATION ROBOT A1 TYPE" indicates the availability of the simulation robot 50 including the robot 50A1.

The determining part 10d determines the configuration of the simulation to be executed by the user. The determining part 10d receives from the manipulation terminal 20 the information on the content of simulation selected by the user with the manipulation terminal 20 and the simulation device 200. The determining part 10d determines an execution of the simulation with the content of simulation and the simulation device 200 which are received, and transmits a command for executing the content of simulation to the simulation device 200. The determining part 10*d* connects the simulation device 200 to the manipulation terminal 20.

The converting part 10*e* converts, during an execution of the second simulation, the first information for manipulating the robot model received from the manipulation terminal 20 into the second information for manipulating the robot model of the simulation device 200. The converting part 10*e* transmits the second information to the simulation device 200 which is executing the simulation. For example, when the simulation device 200 is the simulation computer 40, the second information corresponds to information outputted to the simulation computer 40 from the input device 413 to cause the imaginary robot model to perform operation corresponding to the first information. When the simulation device 200 is the simulation robot 50, the second information corresponds to information outputted to the control device 51 from the manipulation device 518 to cause the robot 50A to perform operation corresponding to the first information.

The operation data processing part 10*f* performs, during the execution of the simulation, processing for converting the operation data of the robot model received from the simulation device 200 into the operation data corresponding to the image display of the robot model on the manipulation terminal 20, and transmits it to the manipulation terminal 20.

For example, when the simulation device 200 is the simulation computer 40, the operation data received from the simulation device 200 may be comprised of an image of the robot model, may be comprised of a simplified image indicative of the operation of the robot model, and may be numerical value data, such as a vector and coordinates, indicative of the operation of the robot model. For example, the simplified image may be an image indicative of the frame of the robot model. The converted operation data may be comprised of an image of the robot model displayed on the manipulation terminal 20, may be comprised of an image of the imaginary robot model generated by the simulation computer 40, may be comprised of a simplified image indicative of the operation of the robot model, and may be a numerical value data indicative of the operation of the robot model.

For example, when the simulation device 200 is the simulation robot the operation data received from the simulation device 200 may be comprised of an image data of the robot 50A captured by the imaging device 517. The converted operation data may be comprised of a captured image data of the robot 50A, may be comprised of a simplified image indicative of the operation of the robot 50A by using feature part(s) in the captured image, and may be a numerical value data indicative of the operation of the robot 50A. The simplified image may be an image of the imaginary robot model, and, in this case, it may be an image using CG (Computer Graphics) or animation. The imaginary robot model described above may or may not be similar to the robot 50A.

The determining part 10*g* evaluates the result of the simulation executed by the simulation device 200. Moreover, the determining part 10*g* determines the user's learning level based on the evaluation, and further determines the user's rank or class based on the learning level. The determining part 10*g* transmits at least one information of the evaluation, the learning level, the rank, and the class to the manipulation terminal 20, and the manipulation terminal 20 causes the output device 30 to present the received information. Moreover, the determining part 10*g* stores the evaluation, the learning level, the rank, and the class in the memory part 10*h* as new user information.

Note that the determining part 10*g* may determine the evaluation based on a difference between operation of the robot model detected by the operation data processing part 10*f* and operation of the robot model to be performed in the simulation, and a relation with a threshold of the difference. The difference may include a difference in the position of each part of the robot model, a difference in time required for the operation, etc. Alternatively, the simulation device 200 may evaluate the result of the simulation and transmit it to the determining part 10*g* so that the determining part 10*g* uses the evaluation.

Figure 9:
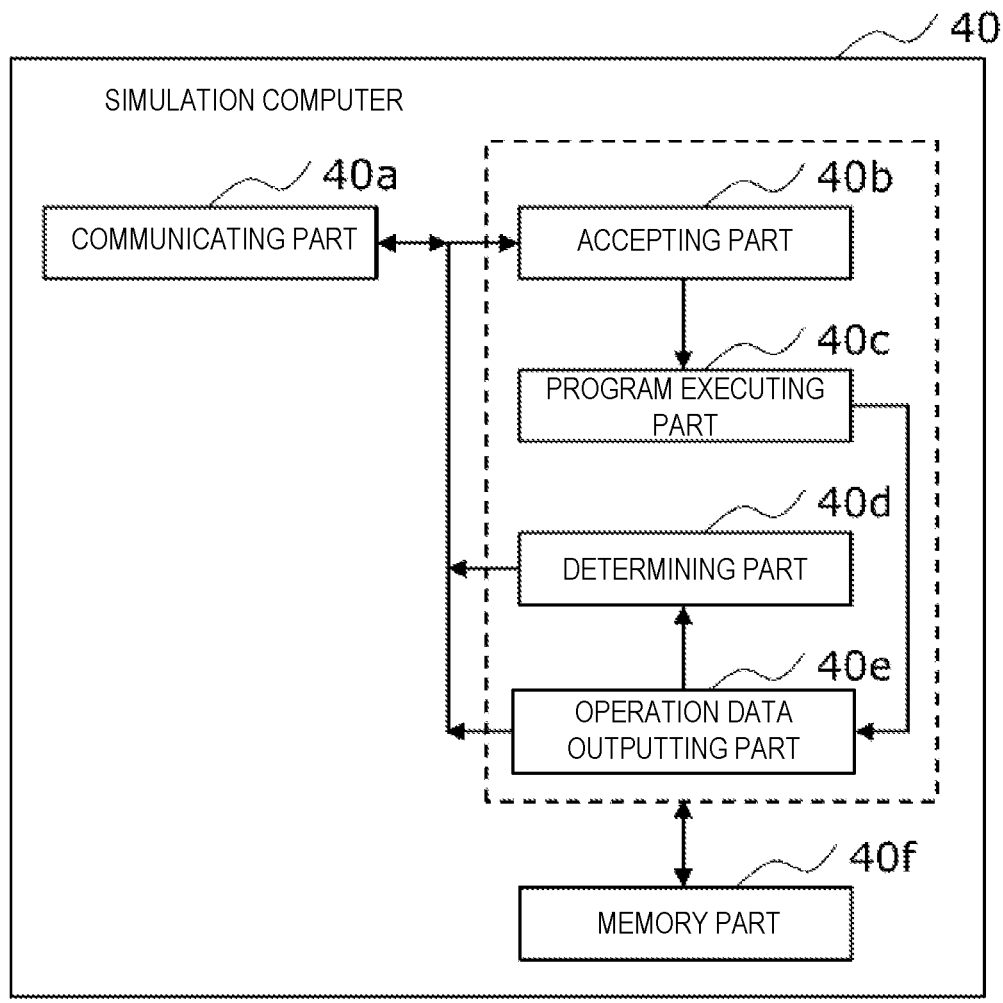
FIG. 9 is a block diagram illustrating one example of a functional configuration of the simulation computer according to the embodiment.

A functional configuration of the simulation computer 40 is described. FIG. 9 is a block diagram illustrating one example of the functional configuration of the simulation computer 40 according to this embodiment. As illustrated in FIG. 9, the simulation computer 40 includes a communicating part 40*a*, an accepting part 40*b*, a program executing part 40*c*, a determining part 40*d*, an operation data outputting part 40*e*, and a memory part 40*f*. Note that not all the components are essential. The function of the communicating part 40*a* is implemented by the network I/F 406 etc. The function of the memory part 40*f* is implemented by the ROM 402 and the memory 404. The functions of the accepting part 40*b*, the program executing part 40*c*, the determining part 40*d*, and the operation data outputting part 40*e* are implemented by the CPU 401, the ROM 402, and the RAM 403.

The communicating part 40*a* communicates with the intermediation device 10 through the communication network 90. The memory part 40*f* stores various information. For example, the memory part 40*f* may store, for the content of each simulation executable by the simulation computer 40, the information on the position of each operation of the robot model executed in the simulation, and the duration. Moreover, the memory part 40*f* may store the threshold used by the determining part 40*d* for the evaluation.

The accepting part 40*b* receives from the intermediation device 10 a command for executing the simulation and the content of the simulation to be executed. The accepting part 40*b* outputs to the program executing part 40*c* the received command for executing the content of simulation. Moreover, after the start of simulation, the accepting part 40*b* receives the second information for operating the imaginary robot model from the converting part of the intermediation device 10, and outputs it to the program executing part 40*c*.

The program executing part 40*c* executes the computer program of the commanded content of simulation. The program is stored in the ROM 402 or the memory 404. The program executing part 40*c* causes the imaginary robot model to execute operation corresponding to the second information, according to the second information and the computer program which are received from the accepting part 40*b*.

The operation data outputting part 40*e* detects the operation result data indicative of the operation result based on the robot model executed by the program executing part 40*c*. This operation result data may include the image of the robot model, the simplified image of the frame etc. of the robot model, the position of each part of the robot model, and time required for moving to the position. Moreover, the operation data outputting part 40*e* generates the operation data based on the operation result data, and transmits it to the intermediation device 10. This operation data is operation data described above about the operation data processing part 10*f* of the intermediation device 10.

The determining part 40d evaluates a result of the simulation by using the operation data generated by the operation data outputting part 40e, and transmits the evaluation to the intermediation device 10. The determining part 40d determines the evaluation similar to the determining part 10g of the intermediation device 10. Moreover, the determining part 40d may determine the user's learning level, rank, and class, and may transmit them to the intermediation device 10.

Figure 10:
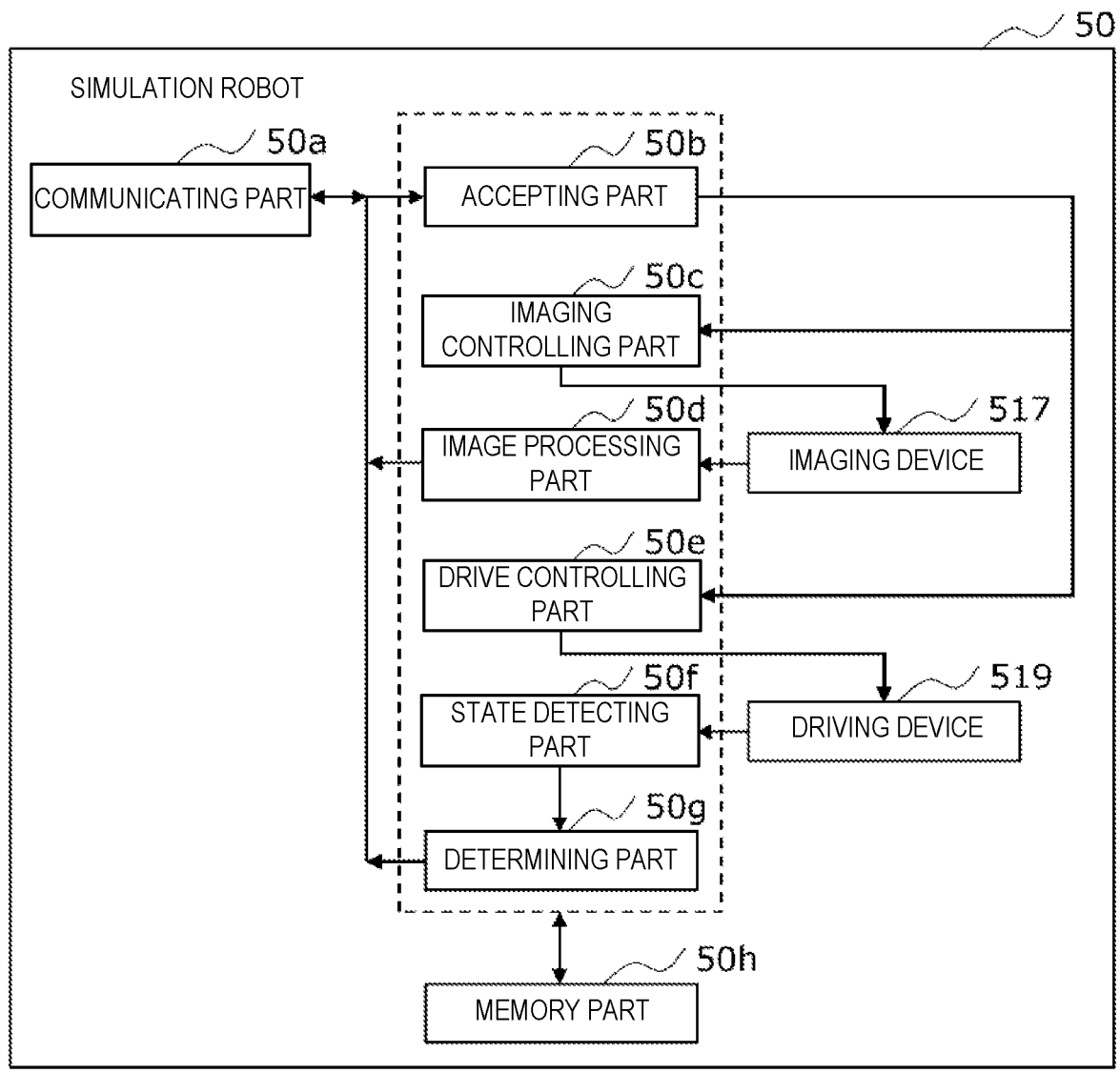
FIG. 10 is a block diagram illustrating one example of a functional configuration of the simulation robot according to the embodiment.

A functional configuration of the simulation robot 50 is described. FIG. 10 is a block diagram illustrating one example of the functional configuration of the simulation robot 50 according to this embodiment. As illustrated in FIG. 10, the simulation robot 50 includes a communicating part 50a, an accepting part 50b, an imaging controlling part 50c, an image processing part 50d, a drive controlling part 50e, a state detecting part 50f, a determining part 50g, a memory part 50h, the imaging device 517, and the driving device 519. Note that not all the components are essential. The communicating part 50a, the accepting part 50b, the imaging controlling part 50c, the image processing part 50d, the drive controlling part 50e, the state detecting part 50f, the determining part 50g, and the memory part 50h constitute the control device 51. The function of the communicating part 50a is implemented by the network I/F 506 etc. The function of the memory part is implemented by the ROM 502 and the memory 504. The functions of the accepting part 50b, the imaging controlling part 50c, the image processing part 50d, the drive controlling part 50e, the state detecting part 50f, and the determining part 50g are implemented by the CPU 501, the ROM 502, and the RAM 503.

The communicating part 50a communicates with the intermediation device 10 through the communication network 90. The memory part 50h stores various information. For example, the memory part 50h may store, for the content of each simulation executable by the simulation robot 50, information on the position, applied force, and the duration of each operation of the robot 50A executed in the simulation. One example of the applied force is a force of the end effector of the robot pushing or pulling the object. Moreover, the memory part 50h may store the threshold used by the determining part 50g for the evaluation.

The accepting part 50b receives from the intermediation device 10 the command for executing the simulation and the content of the simulation to perform. The accepting part 50b outputs the received command for executing the content of simulation to the imaging controlling part 50c and the drive controlling part 50e. Moreover, after the start of simulation, the accepting part 50b receives the second information for operating the robot 50A from the converting part 10e of the intermediation device 10, and outputs it to the drive controlling part 50e.

The imaging controlling part 50c activates the imaging device 517 for imaging, when the command for executing the simulation is received. The imaging device 517 images the robot 50A (e.g., the end effector), and outputs the captured image to the image processing part 50d. The image processing part 50d transmits the image data of the image received from the imaging device 517 to the intermediation device 10.

The drive controlling part 50e drives the driving device 519 according to the second information received from the accepting part 50b to cause the robot 50A to perform the operation corresponding to the second information.

The state detecting part 50f detects a state of each part of the robot and outputs the detected results to the determining part 50g. For example, the state detecting part 50f may detect, as this state, a three-dimensional position of each part by detecting a displacement of the movable part of the robot 50A. At this time, the state detecting part 50f may detect the displacement of a movable part of the robot 50A based on a detected value of a rotation sensor provided to the driving device 519. Moreover, the state detecting part 50f may detect an applied force which is a force acting on the end effector of the robot 50A, as the state described above. At this time, the state detecting part 50f may detect the applied force based on a detected value of a force sensor (e.g., an inner force sensor) provided to the end effector. The state detecting part 50f may be provided with a timer, and may detect the duration between respective operations of the robot 50A as the state described above. The drive controlling part 50e may use the detected result of the state detecting part 50f as feedback information and control the drive of the driving device 519.

The determining part 50g evaluates the result of the simulation based on the detected result of the state detecting part 50f, and transmits the evaluation to the intermediation device 10. The determining part 50g determines the evaluation similar to the determining part 10g of the intermediation device 10. Moreover, the determining part 50g may determine the user's learning level, rank, and class, and may transmit them to the intermediation device 10.

Operation of Simulation System

Figure 11A:
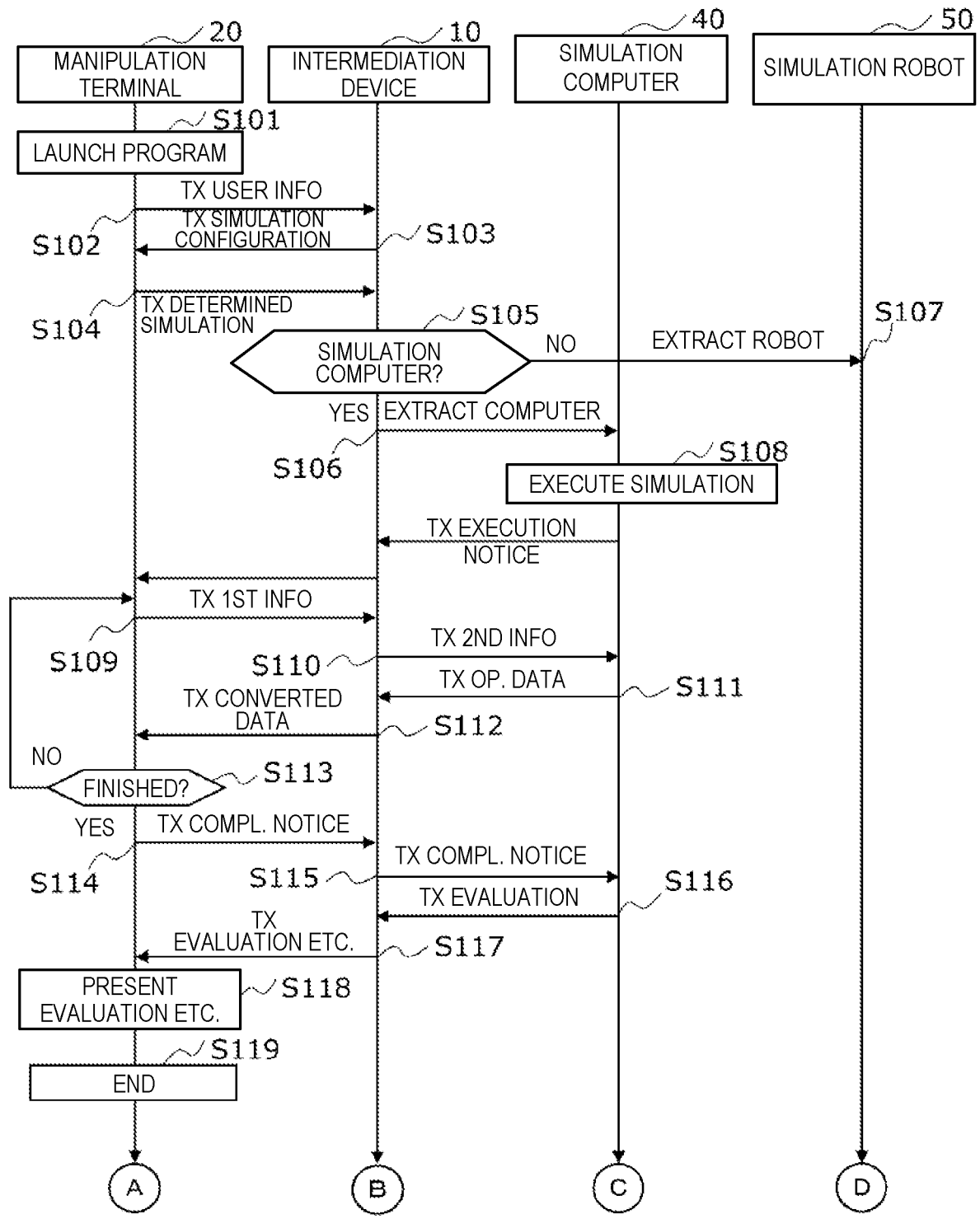
FIG. 11A is a sequence diagram illustrating one example of a flow of operation of the simulation system according to the embodiment.
Figure 11B:
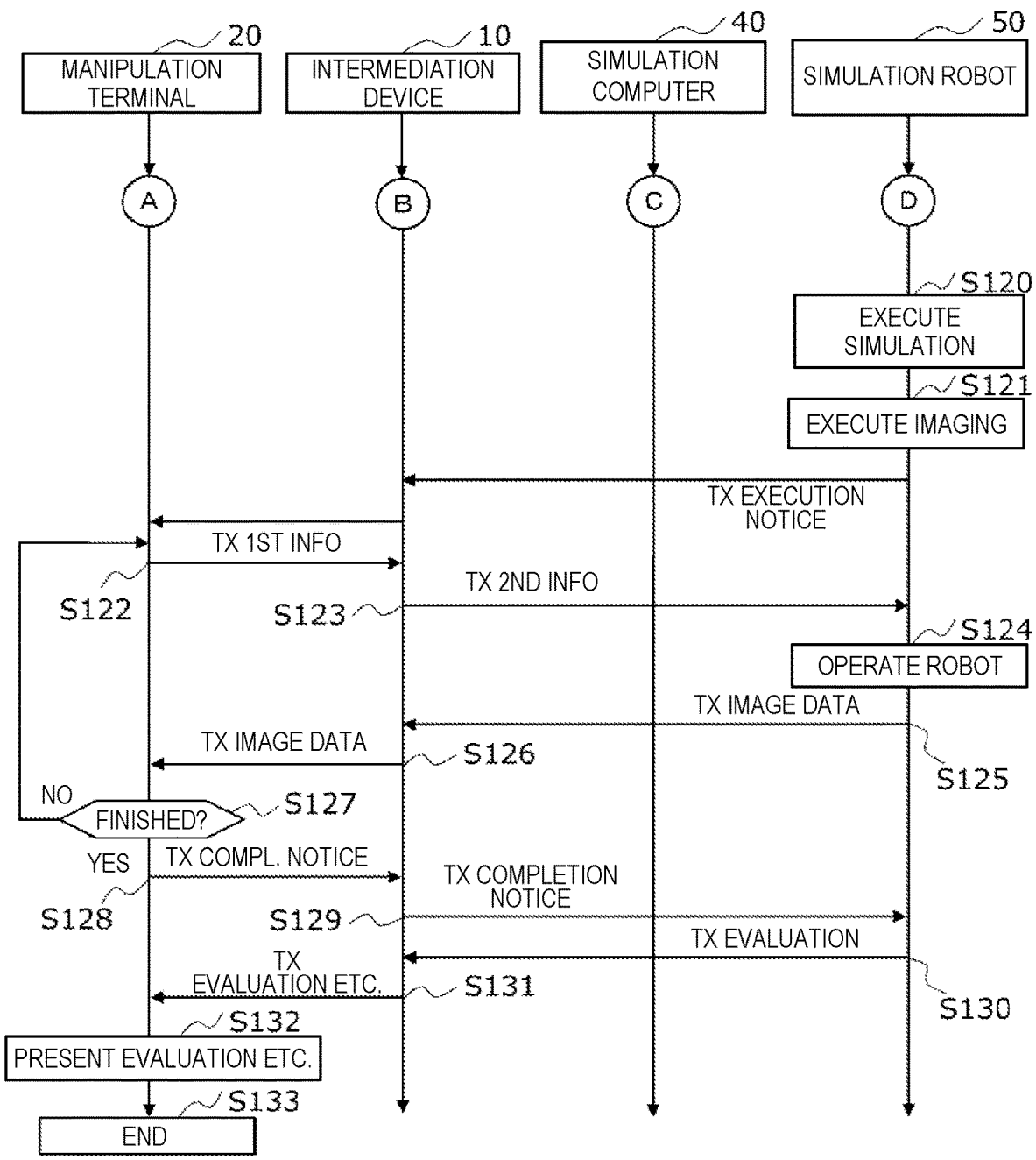
FIG. 11B is a sequence diagram illustrating one example of the flow of operation of the simulation system according to the embodiment.

Operation of the simulation system 1 according to this embodiment is described. FIGS. 11A and 11B are a sequence diagram illustrating one example of a flow of the operation of the simulation system 1 according to this embodiment. As illustrated in FIGS. 11A and 11B, the user launches the game program of the simulation in the manipulation terminal 20 (Step S101). Next, the user inputs into the manipulation terminal 20 the identification information etc. of the user which is the user information, and the manipulation terminal 20 transmits the identification information etc. to the intermediation device 10 (Step S102). That is, the user logs in to the game of simulation. The user's identification information is registered in the intermediation device 10 in advance.

Next, the intermediation device 10 authenticates the received user's identification information, extracts the clearance requirement of simulation corresponding to the identification information, and extracts the configuration of the simulation corresponding to the extracted clearance requirement. Then, the intermediation device 10 transmits the extracted configuration of the simulation to the manipulation terminal 20 as a configuration of a simulation executable by the user (Step S103). The configuration of the simulation is a combination of the content of the simulation, and the simulation device 200 which executes the content of the simulation.

Next, the user uses the manipulation terminal 20, for example, to determine a configuration of the simulation to be executed from the simulation configuration which is a combination of the executable content of the simulation displayed on the output device 30 and the simulation device 200. The manipulation terminal 20 transmits the determined configuration of simulation to the intermediation device 10 (Step S104).

Next, the intermediation device 10 determines whether the simulation device 200 included in the received simulation configuration is the simulation computer 40 (Step S105). If it is the simulation computer 40 (Yes at Step S105), the intermediation device 10 transits to Step S106, and if it is not the simulation computer 40 (No at Step S105), the intermediation device 10 transits to Step S107.

At Step S106, the intermediation device 10 extracts the simulation computer 40, which is executable of the content of the simulation included in the simulation configuration from the simulation computers 40 which can be connected by the intermediation device 10, and connects the simulation computer 40 to the manipulation terminal 20. Moreover, the intermediation device 10 transmits the command for executing the content of the simulation to the simulation computer 40.

Next, the simulation computer 40 performs the commanded content of simulation (Step S108). The simulation computer 40 transmits the notice indicative of an execution of the simulation to the manipulation terminal 20 through the intermediation device 10.

During the execution of the simulation, the manipulation terminal 20 transmits the first information indicative of the manipulation inputted by the user to the intermediation device 10 (Step S109). Moreover, the intermediation device 10 converts the first information into the second information for operating the imaginary robot model of the simulation computer 40, and transmits it to the simulation computer 40 (Step S110). The simulation computer 40 causes the robot model to operate according to the second information, and transmits the operation data of the robot model to the intermediation device 10 (Step S111). The intermediation device 10 converts the received operation data into operation data corresponding to the presentation of the image display etc. of the robot model on the manipulation terminal 20, and transmits it to the manipulation terminal 20 (Step S112). The manipulation terminal 20 causes the output device 30 to present the image etc. of the robot model which executes the operation corresponding to the received operation data. Note that the simulation computer 40 may transmit, as the operation data, the image data of the imaginary robot model to the intermediation device 10, and the intermediation device 10 may transmit the received image data to the manipulation terminal 20. The manipulation terminal 20 may display the received image data on the output device 30.

Next, the manipulation terminal 20 determines whether all the operations included in the simulation under execution is finished (Step S113). If finished (Yes at Step S113), the manipulation terminal 20 transits to Step S114, where it transmits a notice of completion to the intermediation device 10, and if not finished (No at Step S113), it returns to Step S109.

Next, at Step S115, the intermediation device 10 notifies the completion of all the operations included in the simulation to the simulation computer 40. Next, the simulation computer 40 evaluates a result of the simulation based on the operation data of the robot model which through the simulation, and transmits the evaluation result to the intermediation device 10 (Step S116).

Next, at Step S117, the intermediation device 10 determines an evaluation of the simulation result, a user's learning level, a rank, and a class based on the received evaluation result, and transmits at least one of them to the manipulation terminal 20. Moreover, the intermediation device 10 registers the evaluation result, the learning level, the rank, and the class into itself as new user information. Next, the manipulation terminal 20 outputs to the output device 30 the evaluation result, the learning level, the rank, and the class which are received, to present it to the user (Step S118). By the user suspending the manipulation terminal 20, the manipulation terminal 20 ends the game program of the simulation (Step S119).

Moreover, at Step S107 the intermediation device 10 extracts, from the simulation robots 50 which can be connected by the intermediation device the simulation robot 50 including the robot 50A which is executable of the content of simulation included in the configuration of the simulation determined at Step S104, and connects the simulation robot 50 to the manipulation terminal 20. Moreover, the intermediation device 10 transmits a command for executing the content of simulation to the simulation robot 50.

Next, the simulation robot 50 executes the commanded content of simulation (Step S120). Next, the control device 51 of the simulation robot 50 causes the imaging device 517 to image the robot 50A (Step S121). The simulation robot 50 transmits a notice indicative of the execution of simulation to the manipulation terminal 20 through the intermediation device 10.

During the execution of the simulation, the manipulation terminal 20 transmits the first information to the intermediation device 10 (Step S122), and the intermediation device 10 converts the first information into the second information for operating the robot 50A and transmits it to the simulation robot 50 (Step S123). The control device 51 operates the robot 50A according to the second information (Step S124). At this time, the control device 51 detects a state of each part of the robot 50A. Next, the control device 51 transmits the image data captured by the imaging device 517 to the intermediation device 10 (Step S125). The intermediation device 10 transmits the received image data to the manipulation terminal 20 (Step S126). The manipulation terminal 20 causes the output device 30 to present the image etc. of the received image data.

Next, the manipulation terminal 20 determines whether all the operations included in the simulation under execution is finished (Step S127). If finished (Yes at Step S127), the manipulation terminal 20 transits to Step S128, where it transmits notice of completion to the intermediation device 10, and if not finished (No at Step S127), it returns to Step S122.

Next, at Step S129, the intermediation device 10 notifies the simulation robot 50 of the completion of all the operations included in the simulation. Next, the control device 51 of the simulation robot 50 evaluates the result of simulation based on the state of each part of the robot 50A through the simulation, and transmits the evaluation result to the intermediation device 10 (Step S130).

Next, at Step S131, the intermediation device 10 determines the evaluation of the simulation result, and the user's learning level, rank, and class based on the received evaluation result, and transmits at least one of them to the manipulation terminal 20 and registers it into the intermediation device 10 itself. Next, the manipulation terminal 20 outputs the received evaluation result etc. to the output device 30 to present it to the user (Step S132). By the user suspending the manipulation terminal 20, the manipulation terminal 20 ends the game program of the simulation (Step S133).

According to the processings of Steps S101-S133, the user located at a remote place from the simulation device 200 can use, for example, his/her own manipulation terminal 20 to perform the simulation using the simulation computer 40 or the simulation robot 50 through the communication network Thus, the user can improve the level of skill of the manipulation of the robot by executing the simulation using the manipulation terminal 20. For example, in an environment in which the manipulation terminal 20 is connected with an actual robot through the communication network 90, and the robot manipulation is possible from the manipulation terminal 20, the user can perform an actual work by the actual robot using the manipulation terminal 20, while being located at the remote place.

Effects Etc.

In the simulation system 1 according to the above embodiment, the information processing device 100 of the intermediation device 10 converts the first information for manipulating the robot model, which is inputted into the manipulation terminal 20 connected with the simulation device 200 for executing the simulation for causing the robot model to perform the simulated operation, and operated by the remote user of the simulation device 200, into the second information for manipulating the robot model of the simulation device 200, causes the simulation device 200 to operate according to the second information, and causes the manipulation terminal 20 to present the information on the operation of the robot model of the simulation device 200 which operates according to the second information. Note that the manipulation terminal 20 may be connected with the simulation device 200 through the communication network 90. Moreover, for example, the simulated operation of the robot model may be operation which imitates a work performed by the actual robot.

According to the above configuration, the information processing device 100 converts the first information corresponding to the manipulation inputted into the manipulation terminal 20 into the second information, and causes the simulation device 200 to operate according to the second information so that the robot model of the simulation device 200 is caused to perform operation corresponding to the manipulation. Therefore, the user can perform the simulation of the robot operation at the remote place from the simulation device 200, by using the manipulation terminal 20. Moreover, since the information communicating between the manipulation terminal 20 and the simulation device 200 is converted into information on a format adapted for each of the manipulation terminal 20 and the simulation device 200, the user can use, for example, his/her own manipulation terminal 20 which the user is got used to using it. Therefore, the user can easily execute the simulation, and therefore, he/she can easily accept the simulation. Moreover, various manipulation terminals 20 are connectable with the simulation device 200 by the manipulation terminals 20 being connected with the simulation device 200 through the communication network 90. Therefore, various users can access the simulation device 200 through the manipulation terminal 20 and can perform the simulation of the robot manipulation, and therefore, he/she becomes capable of manipulating the robot.

Moreover, in the simulation system 1 according to this embodiment, the manipulation terminal 20 may be at least any of a game machine, a game controller, a remote controller dedicated for a robot, a personal data assistant, a smart device, and a personal computer. According to the above configuration, the simulation using various manipulation terminals 20 becomes possible.

Moreover, the information processing device 100 according to this embodiment may determine, among the plurality of simulation devices 200, the simulation device 200 corresponding to a simulation requested in the request information based on the request information which is inputted into the manipulation terminal 20 and is information on simulation requested to be executed, and may enable the execution of the simulation using the simulation device 200 and the manipulation terminal 20 which are determined.

According to the above configuration, the information processing device 100 can cause the user to execute the various simulations corresponding to his/her request.

Moreover, the information processing device 100 according to this embodiment may evaluate the operation result of the robot model based on the information on the operation of the robot model of the simulation device 200, and may register the evaluation of the operation result as the user evaluation which is the evaluation of the user who operates the manipulation terminal 20. Moreover, the information processing device 100 may determine the simulation which is executable by the user corresponding to the user evaluation, and the simulation device 200 based on the registered user evaluation, and may cause the manipulation terminal 20 to present the information on the determined simulation and simulation device 200.

According to the above configuration, the information processing device 100 registers the evaluation of the result of the simulation as the user evaluation of the manipulation terminal 20. Thus, the utilization of the registered user evaluation is possible. For example, the information processing device 100 can present the user the registered user evaluation when performing the simulation. Therefore, the user can easily determine the configuration of the simulation to perform according to his/her own user evaluation. Moreover, when the user manipulates the actual robot, the determination of the robot and the content of work suitable for the user becomes possible based on the user evaluation. Moreover, the user or a provider (e.g., the intermediation device 10) of the simulation can determine the content of simulation which is suitable for or executable by the user, and the simulation device 200.

Moreover, the information processing device 100 according to this embodiment may convert the information on the operation of the robot model of the simulation device 200 into information which functions on an execution program of the manipulation terminal 20. According to the above configuration, the information processing device 100 can associate the operation of the robot model in the simulation device 200 with the operation on the program executed on the manipulation terminal 20.

Moreover, the information processing device 100 according to this embodiment may enable an execution of the simulation using the simulation computer 40 and the manipulation terminal 20 which cause the imaginary robot model to perform the simulated operation, and may cause the manipulation terminal 20 to present the information on the operation of the imaginary robot model generated by the simulation computer 40. According to the above configuration, the user can execute the simulation of the simulation computer 40 by using the manipulation terminal 20.

Moreover, the information processing device 100 according to this embodiment may enable the execution of the simulation using the simulation robot 50 and the manipulation terminal 20 which cause the actual robot 50A to perform the simulated operation as the robot model, and may cause the manipulation terminal 20 to present the information on the image of the robot 50A captured by the imaging device 517 as the information on the operation of the robot model. According to the above configuration, the user can execute the simulation using the actual robot 50A by using the manipulation terminal 20. Moreover, the user can execute the simulation, while visually recognizing the image of the actual robot 50A.

Moreover, the information processing device 100 according to this embodiment may convert the image of the actual robot 50A into the image of the imaginary robot model, and may cause the manipulation terminal 20 to present the information on the operation of the imaginary robot model in the converted image. For example, the image of the imaginary robot model may be an image which uses CG or animation. According to the above configuration, the image presented to the user by the manipulation terminal 20 can be converted into the image familiar with the user. Therefore, the user becomes more familiar with the simulation.

Moreover, the intermediation device 10 according to this embodiment is provided with the information processing device 100 according to this embodiment, and mediates between the manipulation terminal 20 and the simulation device 200 through the communication network 90. According to the above configuration, similar effects to the information processing device 100 according to this embodiment can be acquired.

Moreover, the simulation system 1 according to this embodiment is provided with the information processing device 100 according to this embodiment, the simulation device 200, and the intermediation device 10 which mediates between the manipulation terminal 20 and the simulation device 200 through the communication network 90. According to the above configuration, similar effects to the information processing device 100 according to this embodiment can be acquired. Note that the simulation system 1 may be further provided with the manipulation terminal 20.

OTHER EMBODIMENTS

As described above, although the example of the embodiment of the present disclosure is described, the present disclosure is not limited to the above embodiment. That is, various modifications and improvements are possible within the scope of the present disclosure. For example, various modifications made to the embodiment, and forms established by combining the components in different embodiments are also encompassed within the scope of the present disclosure.

For example, although in the above embodiment the information processing device 100 is mounted on the intermediation device 10, the present disclosure is not limited to this configuration. For example, the information processing device 100 may be mounted on the manipulation terminal 20 or the simulation device 200. Moreover, the information processing device 100 may be dividedly mounted on two or more devices. For example, a first information processing device and a second information processing device having parts of the function of the information processing device 100 may be mounted on two of the intermediation device 10, the manipulation terminal 20, and the simulation device 200. Alternatively, first to third information processing devices having parts of the function of the information processing device 100 may be mounted on the intermediation device 10, the manipulation terminal 20, and the simulation device 200, respectively.

Moreover, although the simulation system 1 according to the embodiment is provided with the manipulation terminal 20, the intermediation device 10 and the simulation device 200, the present disclosure is not limited to this configuration. For example, the simulation system 1 may not be provided with the intermediation device 10.

Moreover, although in the simulation system 1 according to the embodiment the simulation computer 40 and the simulation robot 50 cause the robot model to operate according to the computer program and data which are set in advance, it is not limited to this configuration. For example, the simulation computer 40 and the simulation robot 50 may use a digital-twin environment. In this case, the simulation computer 40 and the simulation robot 50 may operate, for example, using various data stored on the cloud (i.e., big data). For example, the data may include data obtained by various users performing various simulations using various simulation computers 40 and simulation robots 50, and data obtained by actually performing various works using various robots.

Moreover, the present disclosure may be an information processing method. For example, the information processing method according to one aspect of the present disclosure includes converting the first information for manipulating the robot model which is inputted into the manipulation terminal connected with the simulation device for executing the simulation for causing the robot model to perform the simulated operation and operated by the remote user of the simulation device, into the second information for manipulating the robot model of the simulation device, causing the simulation device to operate according to the second information, and causing the manipulation terminal to present the information on the operation of the robot model of the simulation device which operates according to the second information. According to this method, similar effects to the information processing device 100 etc. can be acquired. Such an information processing method may be implemented by circuitry such as a CPU and an LSI, an IC card, or a sole module.

Moreover, the present disclosure may be a program for implementing the information processing method, or may be a non-transitory computer-readable recording medium where the program described above is recorded. Moreover, the program described above can be, of course, circulated through a transmission medium, such as the Internet.

Moreover, the numerical values, such as ordinal numbers and quantities, used in the above description are to illustrate the technology of the present disclosure concretely, and therefore, the present disclosure is not limited to the illustrated numerical values. Moreover, the connecting relations between the components are to illustrate the technology of the present disclosure concretely, and therefore, the connecting relations for implementing the functions of the present disclosure are not limited to these relations.

Moreover, the division of the blocks in the functional block diagram is one example, and therefore, a plurality of blocks may be implemented as one block, one block may be divided into a plurality of blocks, and/or a part of the function may be moved to another block. Moreover, the functions of the plurality of blocks which have similar functions may be processed parallely or in a time-divided fashion by sole hardware or software.

DESCRIPTION OF REFERENCE CHARACTERS

1 Simulation System
10 Intermediation Device
20 Manipulation Terminal
40 Simulation Computer (Simulation Device)
50 Simulation Robot (Simulation Device)
50A1-50An Robot
90 Communication Network
100 Information Processing Device
200 Simulation Device
517 Imaging Device

The invention claimed is:
1. An information processing device, wherein the information processing device is adapted to:

select one of a simulation computer and a simulation robot as a selected simulation device based on selection information received from a manipulation terminal;

convert first information for manipulating a robot model inputted into the manipulation terminal connected with the selected simulation device configured to execute a simulation for causing the robot model to perform a simulated operation and operated by a remote user of the selected simulation device, into second information for manipulating the robot model of the selected simulation device;

operate the selected simulation device according to the second information; and cause the manipulation terminal to present information on the simulated operation of the robot model of the selected simulation device configured to operate according to the second information.

2. The information processing device of claim 1, wherein the information processing device is adapted to:

determine, based on request information that is inputted into the manipulation terminal and is information on the simulation requested to be executed, the selected simulation device corresponding to the simulation requested in the request information among a plurality of simulation devices; and enable an execution of the simulation using the selected simulation device and the manipulation terminal.

3. The information processing device of claim 1, wherein the information processing device is adapted to:

evaluate an operation result of the robot model based on information on the operation of the robot model of the selected simulation device; and register the evaluation of the operation result as a user evaluation that is an evaluation of the user who operates the manipulation terminal.

4. The information processing device of claim 3, wherein the information processing device is adapted to:

determine a simulation executable by a user corresponding to the user evaluation and the selected simulation device based on the registered user evaluation; and cause the manipulation terminal to present information on the determined simulation and selected simulation device.

5. The information processing device of claim 1, wherein the simulated operation of the robot model is operation simulating a work performed by an actual robot.

6. The information processing device of claim 1, wherein the information processing device is adapted to:

when the information processing device selects the simulation computer as the selected simulation device
enable an execution of the simulation using the manipulation terminal and the simulation computer to cause an imaginary robot model to perform the simulated operation; and
cause the manipulation terminal to present information on the operation of the imaginary robot model generated by the selected simulation device.

7. The information processing device of claim 1, wherein the information processing device is adapted to:

when the information processing device selects the simulation robot as the selected simulation device
enable an execution of the simulation using the manipulation terminal and the simulation robot to cause an actual robot to perform the simulated operation as the robot model; and
cause the manipulation terminal to present information on an image of the robot captured by an imaging device as information on the operation of the robot model.

8. The information processing device of claim 7, wherein the information processing device is adapted to:

convert the image of the robot into an image of an imaginary robot model; and cause the manipulation terminal to present information on operation of the imaginary robot model in the converted image.

9. The information processing device of claim 1, wherein the manipulation terminal is connected with the selected simulation device through a communication network.

10. The information processing device of claim 1, wherein the manipulation terminal is at least any of a game machine, a game controller, a remote controller dedicated for a robot, a personal data assistant (PDA), a smart device, and a personal computer.

11. An intermediation device, comprising the information processing device of claim 1, wherein the intermediation device mediates between the manipulation terminal and the selected simulation device through a communication network.

12. A simulation system, comprising:

the information processing device of claim 1;

the selected simulation device; and an intermediation device configured to mediate between the manipulation terminal and the selected simulation device through a communication network.

13. The simulation system of claim 12, further comprising the manipulation terminal.

14. An information processing method, comprising the steps of:

selecting one of a simulation computer and a simulation robot as a selected simulation device based on selection information received from a manipulation terminal;

converting first information for manipulating a robot model inputted into the manipulation terminal connected with the selected simulation device configured to execute a simulation for causing the robot model to perform a simulated operation and operated by a remote user of the selected simulation device, into second information for manipulating the robot model of the selected simulation device;

causing the selected simulation device to operate according to the second information; and causing the manipulation terminal to present information on the simulated operation of the robot model of the selected simulation device configured to operate according to the second information.

\* \* \* \* \*